(12) United States Patent
Baychar

(10) Patent No.: US 10,980,309 B2
(45) Date of Patent: *Apr. 20, 2021

(54) PERFORMANCE FOOTWEAR, APPAREL OR MEDICAL ACCESSORY PRODUCT FOR HOT, COLD, AND ALL-WEATHER CONDITIONS, THE PERFORMANCE FOOTWEAR, APPAREL OR MEDICAL ACCESSORY PRODUCT COMPRISED OF A SERIES OF MATERIAL LAYERS

(71) Applicant: SOLID WATER HOLDINGS, Farmington, ME (US)

(72) Inventor: Baychar, Farmington, ME (US)

(73) Assignee: SOLID WATER HOLDINGS, Farmington, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,618

(22) Filed: Aug. 30, 2017

(65) Prior Publication Data

US 2017/0360146 A1 Dec. 21, 2017

Related U.S. Application Data

(63) Continuation of application No. 15/244,268, filed on Aug. 23, 2016, which is a continuation of application
(Continued)

(51) Int. Cl.
*A43B 5/04* (2006.01)
*A43B 3/00* (2006.01)
(Continued)

(52) U.S. Cl.
CPC .......... *A43B 5/0405* (2013.01); *A43B 3/0084* (2013.01); *A43B 5/002* (2013.01);
(Continued)

(58) Field of Classification Search
CPC .......... A43B 19/00; A43B 5/002; B32B 5/26; Y10T 428/1362
(Continued)

(56) References Cited

U.S. PATENT DOCUMENTS 4,957,795 A 9/1990 Riedel
5,405,644 A 4/1995 Ohsumi et al.
(Continued)

FOREIGN PATENT DOCUMENTS

WO 00/63477 10/2000
WO WO-0063477 A1 * 10/2000 ............... A43B 7/34

OTHER PUBLICATIONS

Nanotech Advances Nanew Fabric (published Jan. 10, 2001).

*Primary Examiner* — Vincent Tatesure
(74) *Attorney, Agent, or Firm* — Mattingly & Malur, PC

(57) ABSTRACT

A performance footwear, apparel or medical accessory product for hot, cold, and all-weather conditions, the performance footwear, apparel or medical accessory product comprised of a series of material layers having: a first layer of a breathable, moisture transfer, antimicrobial inner lining, fabric or nonwoven material or a combination of fabric or nonwoven material; a second layer comprising a breathable, moisture transfer, absorbent, antimicrobial, mechanically bonded, antimicrobial, nonwoven material comprised of shaped, channeled, grooved and lobed synthetic polymer fibers, antimicrobial silver polymer fibers and natural and synthetic, thermal and cooling fibers wherein the fiber combinations naturally provide adjustable thermal regulation; and a third exterior layer comprised of a breathable, antimicrobial woven fabric, knitted fabric, spacer fabric, nonwoven material, leather material or a combination thereof.

32 Claims, 23 Drawing Sheets

Related U.S. Application Data

No. 13/926,152, filed on Jun. 25, 2013, now abandoned, which is a continuation of application No. 12/830,786, filed on Jul. 6, 2010, now abandoned, which is a continuation of application No. 11/583,881, filed on Oct. 20, 2006, now abandoned, said application No. 15/244,268 is a continuation-in-part of application No. 12/824,952, filed on Jun. 28, 2010, which is a continuation of application No. 11/822,571, filed on Jul. 9, 2007, now abandoned, which is a continuation of application No. 11/098,639, filed on Apr. 5, 2005, now abandoned.

(60) Provisional application No. 60/730,941, filed on Oct. 28, 2005, provisional application No. 60/559,009, filed on Apr. 5, 2004.

(51) Int. Cl.

| | |
|---|---|
| *A43B 7/12* | (2006.01) |
| *A43B 19/00* | (2006.01) |
| *B29C 63/00* | (2006.01) |
| *B32B 5/26* | (2006.01) |
| *A43B 23/07* | (2006.01) |
| *A43B 5/00* | (2006.01) |
| *A43B 7/14* | (2006.01) |
| *A43B 7/20* | (2006.01) |
| *B29L 31/30* | (2006.01) |
| *B29L 31/50* | (2006.01) |
| *B29L 31/52* | (2006.01) |

(52) U.S. Cl.
CPC .............. *A43B 5/049* (2013.01); *A43B 7/125* (2013.01); *A43B 7/144* (2013.01); *A43B 7/145* (2013.01); *A43B 7/1475* (2013.01); *A43B 7/20* (2013.01); *A43B 19/00* (2013.01); *A43B 23/07* (2013.01); *B29C 63/0073* (2013.01); *B32B 5/26* (2013.01); *B29K 2995/0069* (2013.01); *B29L 2031/30* (2013.01); *B29L 2031/501* (2013.01); *B29L 2031/52* (2013.01); *Y10T 428/1362* (2015.01)

(58) Field of Classification Search
USPC .................................................. 36/55; 442/59
See application file for complete search history.

(56) References Cited

U.S. PATENT DOCUMENTS

| | | | |
|---|---|---|---|
| 5,776,380 A | 7/1998 | Baigas | |
| 6,048,810 A * | 4/2000 | Baychar | ................. A41D 27/02 36/117.3 |
| 6,077,597 A | 6/2000 | Pause | |
| 6,790,797 B1 | 9/2004 | Benim | |
| 9,943,135 B2 | 4/2018 | Baychar | |
| 2003/0170453 A1* | 9/2003 | Foss | ........................ A01N 57/16 428/373 |
| 2010/0269241 A1 | 10/2010 | Baychar | |

\* cited by examiner

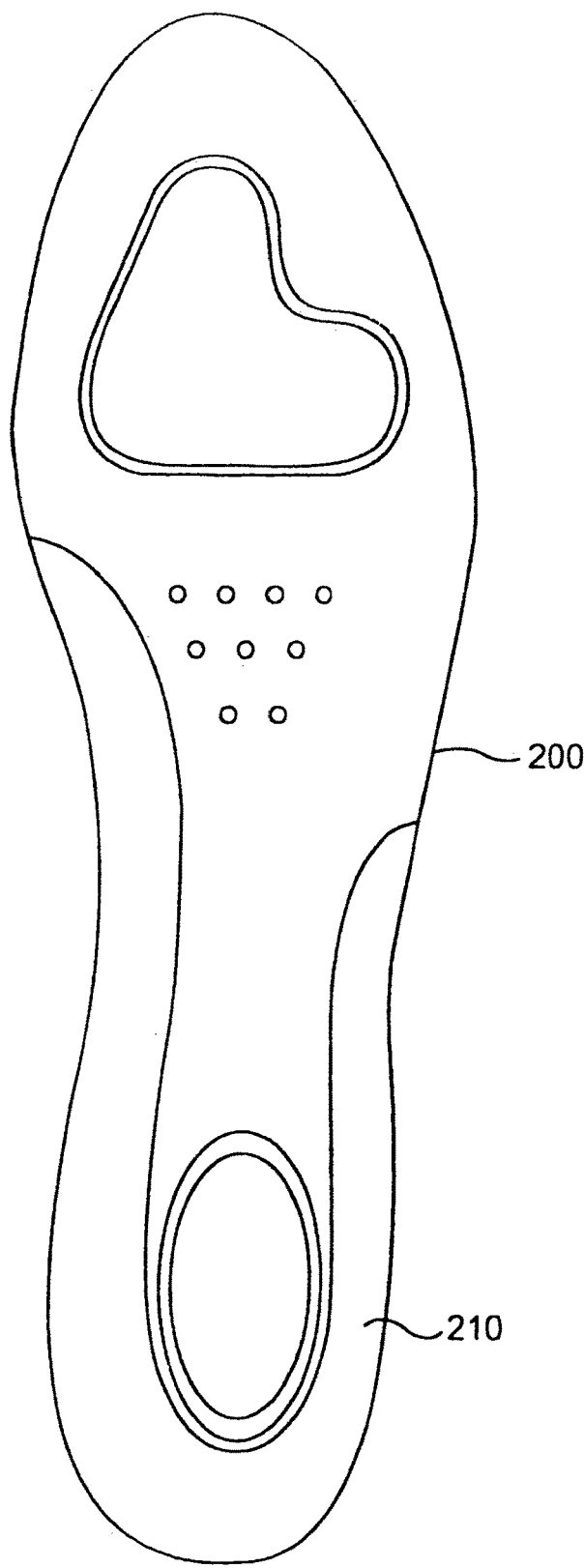
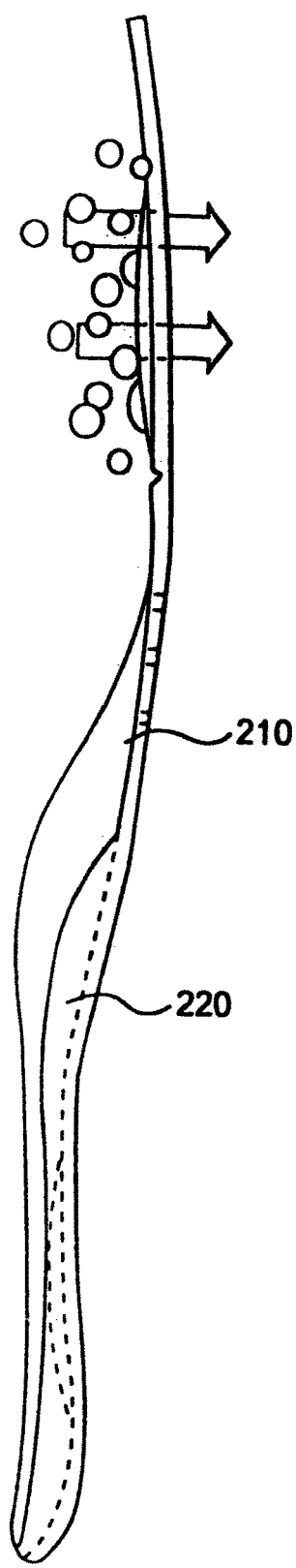
FIG. 5(a)     FIG. 5(b)

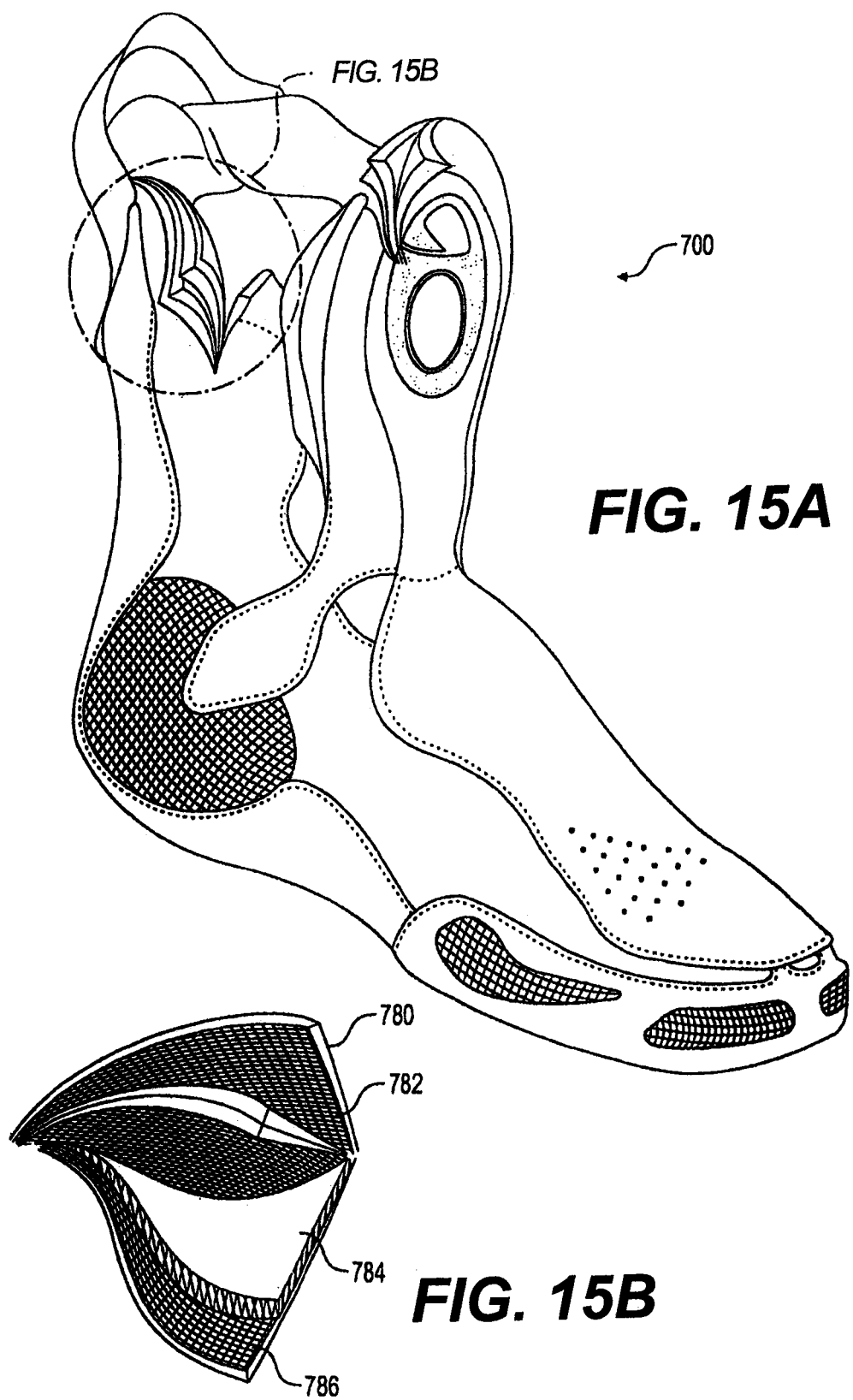

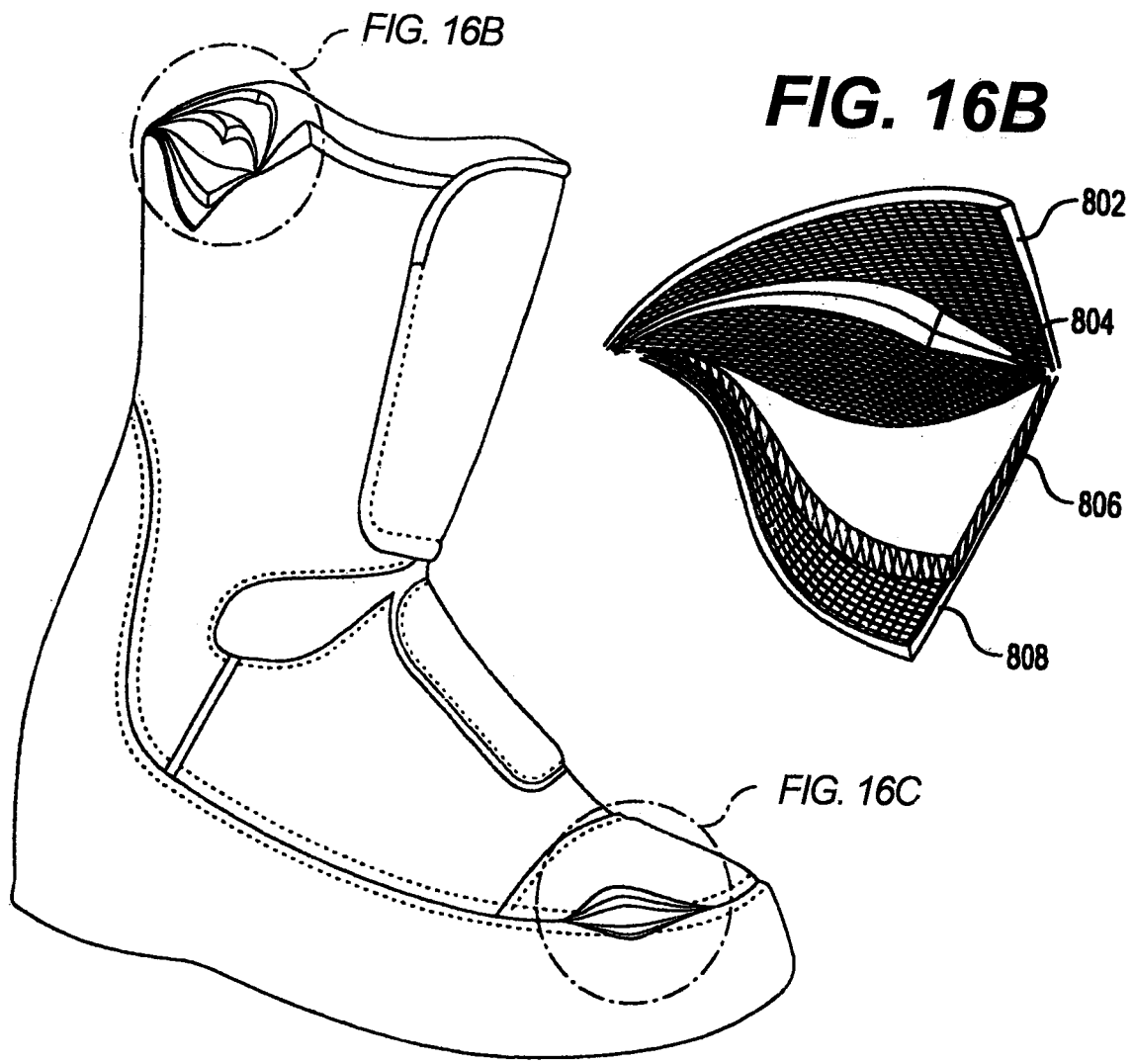
FIG. 16A
FIG. 16B
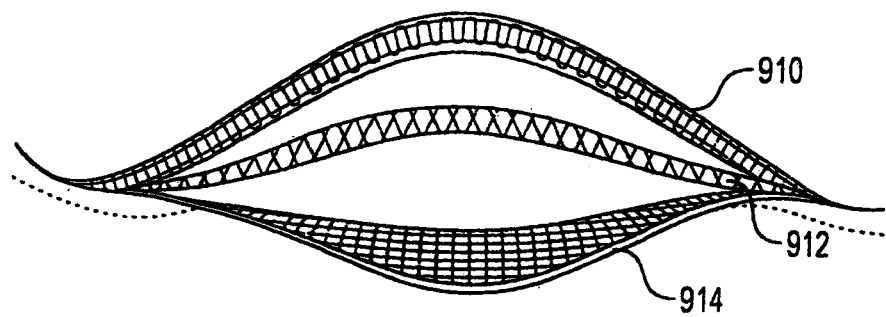
FIG. 16C

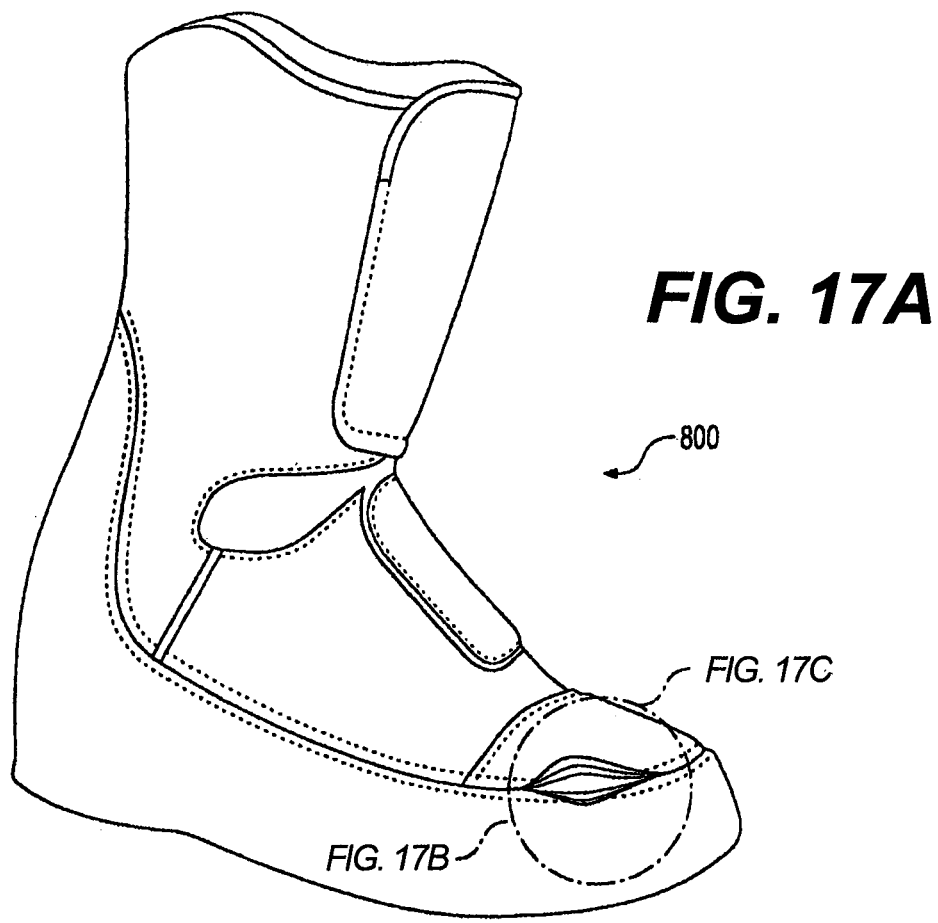
FIG. 17A
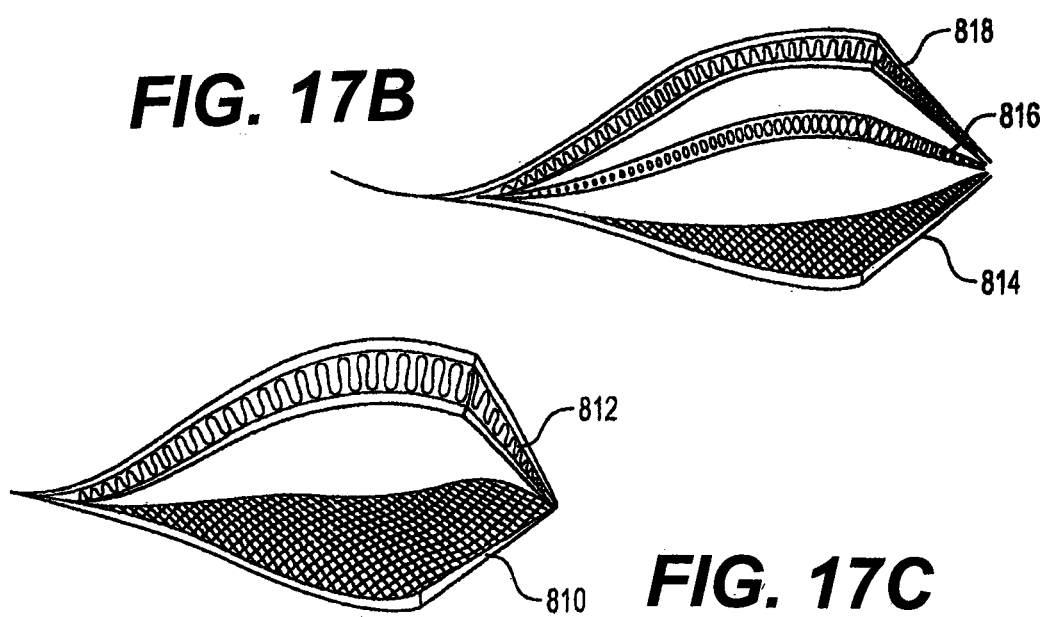
FIG. 17B
FIG. 17C

PERFORMANCE FOOTWEAR, APPAREL OR MEDICAL ACCESSORY PRODUCT FOR HOT, COLD, AND ALL-WEATHER CONDITIONS, THE PERFORMANCE FOOTWEAR, APPAREL OR MEDICAL ACCESSORY PRODUCT COMPRISED OF A SERIES OF MATERIAL LAYERS

FIELD OF THE INVENTION

The present invention relates to composite materials, removable insert liners and completed product constructions with a non-removable liner used in a variety of applications. For example, the liner of the present invention may be employed in a variety of applications including in-line, ice or hockey skates (shell and soft boot) and the like. This liner system composite may be utilized for all weather boots and alpine and hiking applications. The liner is breathable, transfers moisture and waterproof to increase comfort for the skater. The liner may contain thermal fibers, thermal PCM encapsulated molecules or fibers and/or a silica, acrylic, polyester fiber based polymers micro-spheres or the like containing air, polymers or liquid fibers that aid in cooling or thermal regulating temperatures during performance and are capable of absorbing an electrical charge. The microsphere encapsulating the air, polymer or electrically sensitive to thermal absorbing material may be constructed of an inherently conductive polymer such as those created by the Polymer Research Institute in New South Wales, Australia.

BACKGROUND OF THE INVENTION

Various types of liners are known in prior art. These liners are designed to provide certain levels of comfort and durability. Furthermore, in-line skates are also well-known in the art as evidenced by U.S. Pat. Nos. 5,340,132; 5,397,141; and 5,437,466. Of these patents, only U.S. Pat. No. 5,437,466 discloses what is commonly referred to as a "soft-boot". In other words, the shoe body is made of a soft, pliable material. General statements are provided about the materials used for the shoe body, but not in great detail. All of the patents listed above are hereby incorporated by reference.

However, the liners in ice hockey and in-line skates, as well as snowboard boots, etc., known in the art do not provide the advantages realized by the present invention. With the art of hockey and in-line skating becoming increasingly recreational, numerous categories of skaters are developing in large numbers. The present inventor has recognized the problems faced by the aggressive and the recreational categories of skaters and has developed a liner to overcome such problems.

There is an ongoing need for comfort, moisture transfer, breathability, and support for both removable liners as well as non-removable hockey, ice and soft boot liners. In prior removable liner design, the conventional liner is often constructed with rigid, non-breathable outer materials such as vinyls, foams, and nylons. The inner liners have been leather, nylon, or polyester blends which extremely limited the ability to breathe or wick moisture away from a skater's body. These materials have prevented the foot from breathing adequately. In the case of "shell boot" skates, the plastic material that forms the outer shell boot structure holds the heat and moisture inside the boot. As a result, the lining becomes saturated with sweat which adversely affects the skater's comfort and performance level. This problem is even worse with the aggressive hockey skaters whose needs for proper ventilation are even greater.

SUMMARY OF THE INVENTION

An object of the present invention is to provide a lining system employing a cooler, warmer, drier and more breathable liner that meets the needs of each individual skater. Accordingly, the liner of the present invention can be accommodated to the needs of skaters of various skill categories by permitting the inner liner material, which is against the foot, to vary in fiber content and construction.

This object of the present invention is realized by providing a lining system having lining materials which acts as a moisture transfer system and poses inherent moisture transfer polymers fibers and absorbent natural and synthetic fibers. The fibers may be combined in knits, wovens, nonwovens or in a combined construction of two or more constructions. An example of a combined construction is a warp-knit fabric such as such as the SENSITIVE Fabrics. Moisture vapors are transferred through the liner from one side to the other side by a multi-layered technically engineered fiber and foam system. In several composite systems the technically nonwoven fibers replace the foam. This is accomplished by utilizing certain materials in a manner determined by the inventor after considerable experimentation and effort. The details of the specific materials as used in the combination are disclosed in the Detailed Description of the Preferred Embodiments.

The moisture transferring lining system of the present invention overcomes the problems in the prior art lining systems and liners and meets the needs of even the most aggressive skaters.

Various other objects, features and advantages of the present invention will become readily apparent in view of the following detailed description of the preferred embodiments in conjunction with the drawings.

BRIEF DESCRIPTION OF THE DRAWINGS

FIGS. 5(a) and 5(b) illustrate a sole portion of a shoe constructed according to a preferred embodiment of the present invention.

FIGS. 15A and 15B illustrate another embodiment of an insert for an in-line skate or hockey skate with a third portion enlarged.

FIGS. 16A, 16B and 16C illustrate an insert for a soft-shell alpine boot with first and second portions enlarged.

FIGS. 17A, 17B and 17C illustrate an insert for a soft-shell alpine boot with first, second and third portions enlarged.

DETAILED DESCRIPTION OF THE PREFERRED EMBODIMENTS

The following detailed description of the preferred embodiments of the present invention is undertaken in connection with the drawings. This description, while undertaken with respect to the disclosed embodiments, is intended to enable a variety of different applications and slight modifications which form a part of the present invention. More specifically, many of the materials used in this lining system have been developed relatively recently, and in many cases are still being modified and improved.

Where possible, trade names of specific products have been used to assist in the understanding of the invention. The lining system according to the present invention can be easily adapted to accommodate further developments currently envisioned are set forth below.

Figure 1:
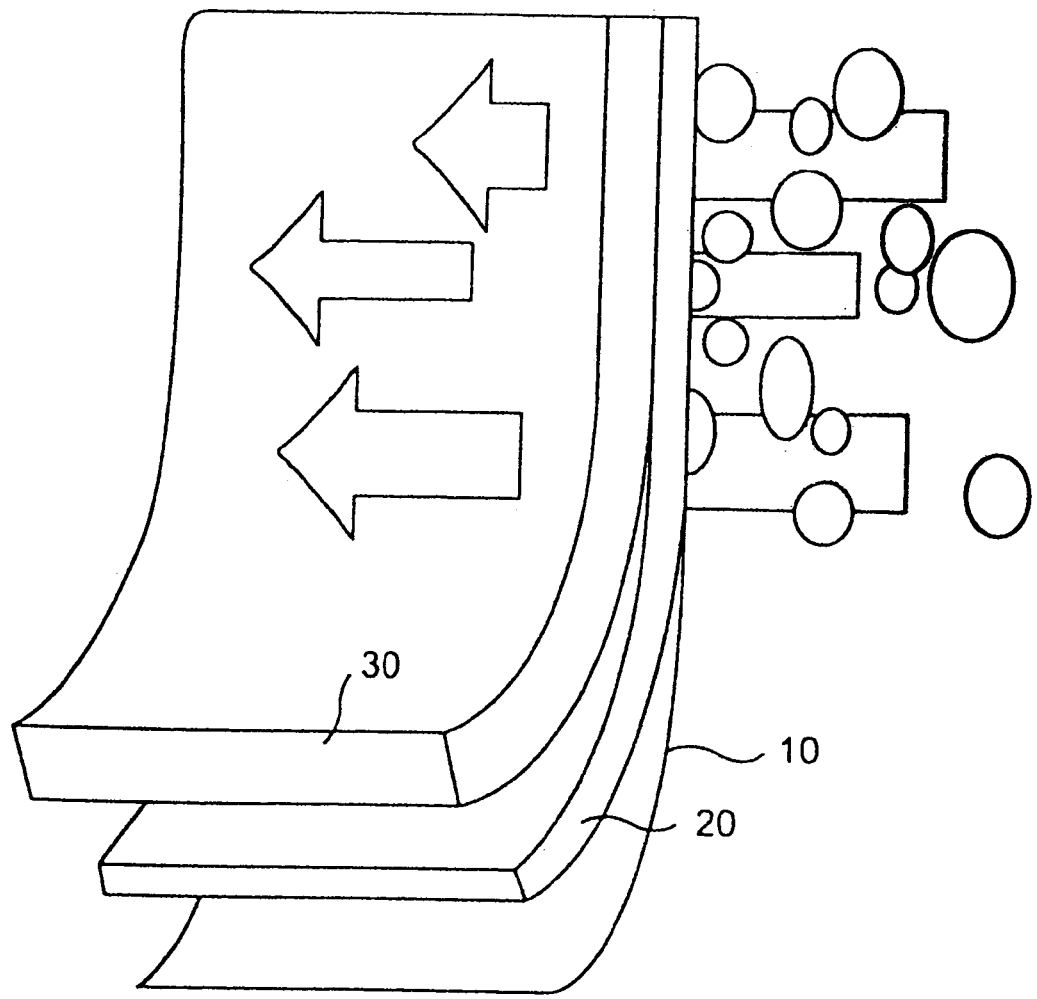
FIG. 1 illustrates a first portion of the liner according to a first embodiment of the present invention.

FIG. 1 illustrates a portion of the liner, or lining system, according to a first embodiment of the present invention. As shown in FIG. 1, a first foam (20) is provided between an inner liner (10) and a second foam or nonwoven material (30). The inner liner (10) can be attached to the first foam material (20) by lamination, stitch, needled or ultrasonically bonded, or the like. The second foam (30) is a germicidal anti-microbial reticulated and/or hydrophilic open cell foam and has a thickness of approximately 1/16 to 1/4 inch. Optionally, the first and second foam layers 20 and 30 may be a nonwoven and foam composite, a foam included in a nonwoven fiber or a foam with selected fibers flocked or needled fabric into either side. The first foam material is also preferably germicidal reticulated or open-cell hydrophilic and has a thickness of approximately 1/16-1/8 inch. Alternatively, the first and second foam maybe replaced by a technically engineered, nonwoven fiber blend with or without open cell foam inclusive or an moisture transfer, breathable, elastomeric composite or a foam and nonwoven fiber composite. A technically engineered nonwoven spacer fabric with natural and/or synthetic fibers can be substituted in some performance categories and be utilized in layers 20 and 30. The moisture transferring nonwoven or nonwoven and foam layers are combined by needling, lamination, ultrasonic bonding, flocking or the like to the back of the inner lining fabric. The spacer fabric may also be combined with the nonwoven composite with or with out foam in the same manner as mentioned above.

The elastomeric patent and process patent listed below are hereby incorporated by reference: U.S. Pat. No. 6,074,966, entitled "Nonwoven Fabric Composite Having Multi-directional Stretch Properties Utilizing a Cellular or Foam Layer", and U.S. Pat. No. 6,479,009 B1, entitled "Method For Producing Nonwoven Fabric Composite Having Multi-directional Stretch Properties Utilizing a Cellular or Foam Layer".

The elastomeric cellular process is further developed in this application with a combined wet lay and/or dry lay process. The polymer base and aqueous phase are sprayed from the jets and combined during the water jet or air pressurization with the fiber mesh. The selected fiber blend is distributed on a screen bed is fused in one process as the polymer and aqueous phase combine with the fiber surface, react and solidifies. The polymer base reacts and solidifies as the aqueous phase is combined during the pressurization. All three elements, the polymer base, the aqueous phase and the fibers, are fused together with pressure on the screen surface creating an elastomeric, cellular nonwoven product.

This water or air jet combines the polymer base and aqueous solution during the active spray and pressurization and can regulate the amount of polymer or aqueous phase needed for selected performance categories in this invention.

All the nonwovens in this invention are selected for the inherent ability to transfer and/or absorb moisture and may have anti-microbial silver fibers by Foss, Static or the like added to the blend. In a number of options, the fibers included in the inner lining material, or nonwoven top sheet are embedded in the foam and possess anti-microbial, thermal and conductive properties. All of the foam materials used in the present invention are assumed to be breathable, hydrophilic, open cell and their thickness is variable. Depending on the application, some of the foam materials may not be used and the thickness of any foam material or spacer fabrics that is used can be changed as needed. All the foams in this application may include Microsphere Technology. For example, a foam called Aquazone, Premium, VPF by Foamex, Comfortemp by Frisby or the like, Netsorb by Vita Olympic, CoFoam Hydrophilix, or Dri-Z by Dicon, hydrophilic foam with nonwoven fibers or the like can be used. Preferably, the germicidal, anti-microbial hydrophilic, flocked fiber open cell hydrophilic foam or a reticulated foam is treated with a surfactant to increase the moisture transfer rate. These chemical friendly additives can be combined directly into the foam polymer or may be applied after the foam is created. A hydrophilic coating such as that created by Ciba Specialty Chemicals (ULTRAPHIL), Wisconsin Global Technology or the like may be added to the foam matrix or nonwoven abutting the foam. The foam can be attached to a non-woven top sheet of synthetic or natural fibers. The fibers may be flocked into the foam or added to the liquid polymer. The preferably, nonwoven fiber selection includes wood pulp and cotton, corn, kapok, lyocel, acrylic, chlorofibre, acetate, wool, hemp, polypropylene, polyester, rayon, LYCRA®, elastine, SPANDEX®, elastine or SPANDEX® or a combination thereof. This top sheet is designed to absorb and move moisture. The addition of LYCRA®, elastine, SPANDEX® or elastine or SPANDEX® to achieve stretchable properties are optional. Evolon®, a product by Freudenberg with or without stretchable properties, may be used as a top sheet option in any layer in this invention. Nonwovens by Freudenberg with elastomeric or stretchable properties are preferred in this invention in some performance categories. However, any nonwoven that is comprised of absorbent and moisture transferring properties with or without stretchable characteristics can be applied. In some options tubular knits can be used for protective gear or skate liner uppers, tongues, heels cups or toe boxes. The nonwoven or nonwoven knitted layer can be ionized to increase the moisture transfer and enhance performance.

Figure 22:
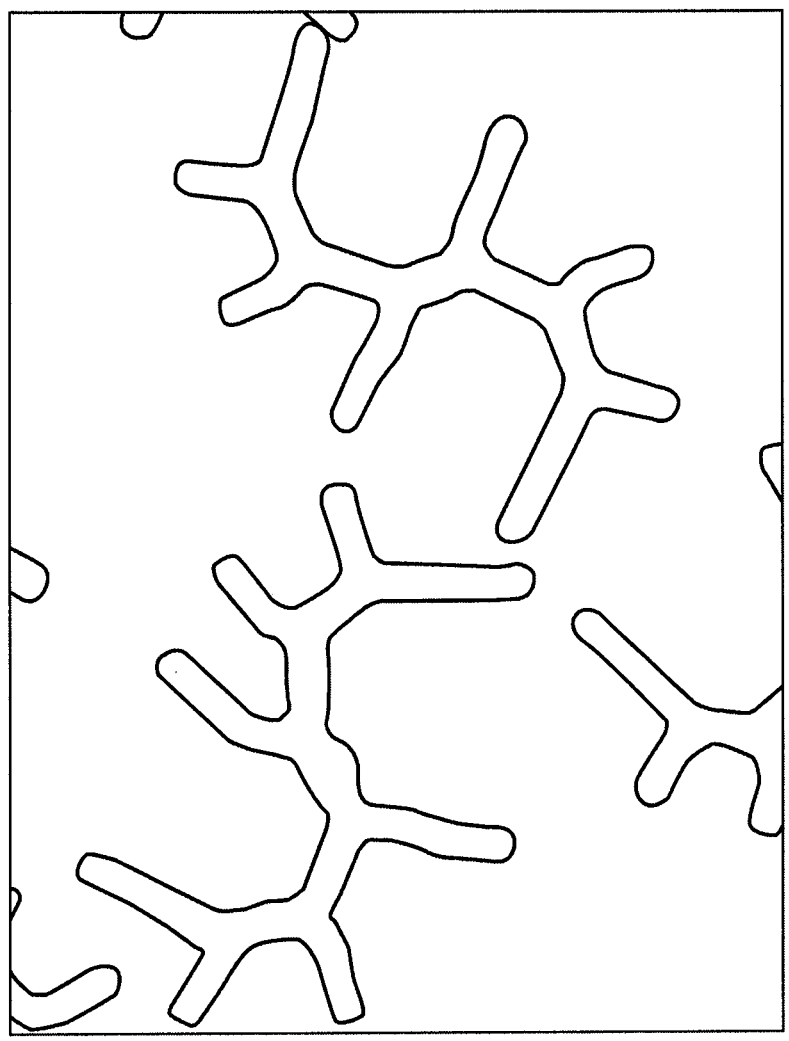
FIG. 22 illustrates grooved fibers.
Figure 23:
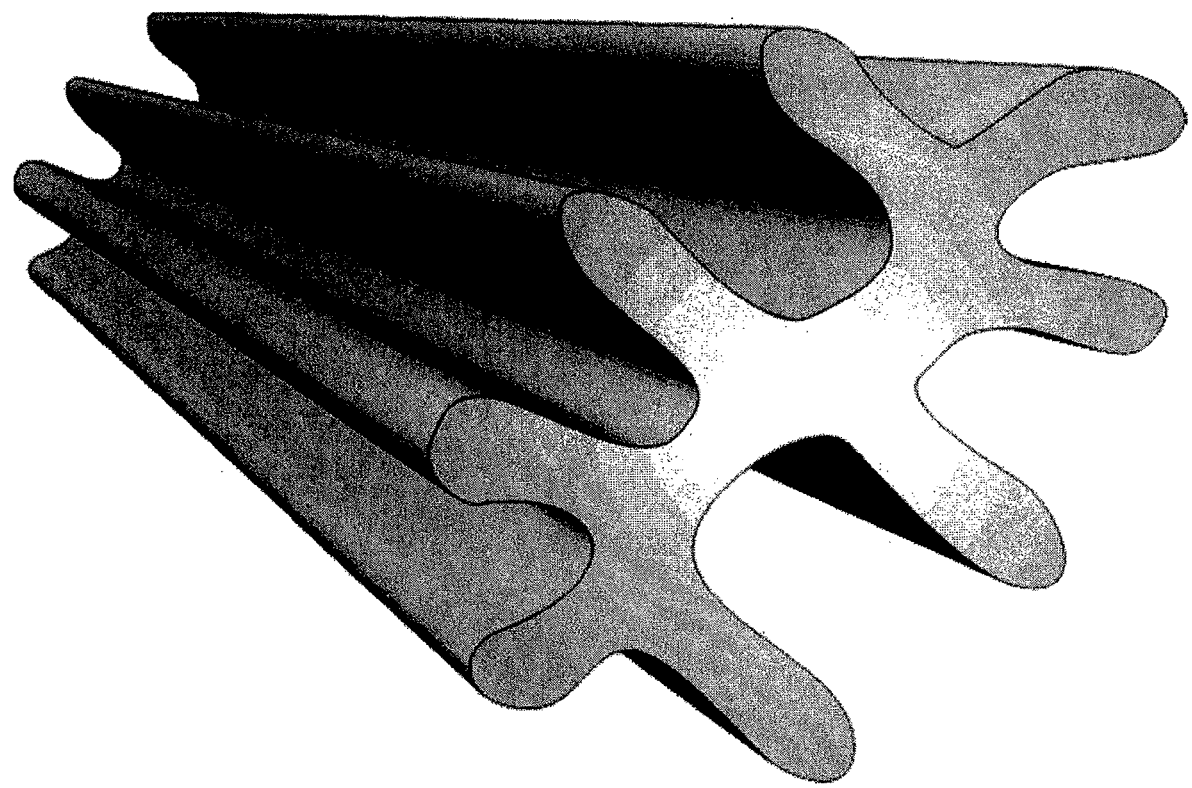
FIG. 23 illustrates grooved fibers.

The nonwoven may contain one or more combinations of split fibers, hollow fibers, grooved fibers (see FIGS. 22 and 23), shaped fibers, anti-microbial fibers or treatments. In some options the nonwoven layer is the inner lining material or outer shell material selection. The moisture transfer nonwoven antimicrobial composite comprised of a moisture transfer nonwoven, open cell foam layer abutting another moisture transfer nonwoven may comprise the entire liner in a skate, hockey or helmet. The breathable moisture transfer composite system may be enhanced with phase change technologies or additional fiber technology benefits.

The select nature and synthetic fibers and shaped, hollow and split fibers in the nonwoven group have inherent moisture transfer and absorption properties and can be treated with a number of MVT surfactants or wicking solution to increase performance. Intera Technology, Ultraphil, nanotechnology or the like are treatments that enhance moisture transfer performance. Nano-technology may be applied to the nonwoven fibers to enhance moisture transfer or waterproof the nonwoven layer. Nano-Technology by Burlington Technologies or Toray Industries is preferable. Cofoam, a hydrophilic foam treatment by Hydrophilix may be applied to the foam or nonwovens to increase the rate of transfer. Coolfix which is developed by Trend Technology, Wisconsin Global Technology or Feran Ice Process may be included in this nonwoven layer fiber, fabric foam layers or combinations in this application. The nonwoven top sheet construction may optionally be replaced by a knitted fiber construction. The nonwoven top sheet or knitted fiber construction may be utilized for a scrum on either side of a foam or thermal nonwoven. The selected nonwoven fiber or blend of fibers may be inclusive in the thermal nonwoven blend, the foam or nonwoven wet-laid, spun bond or needle punch product may be inclusive in the foam. The nonwoven fibers in this application are extremely important and they are selected for the abilities, as stated previously, to transfer moisture, absorb, increase or decrease temperature and provide stability. They are both active and passive in their performance. The polyester fiber inclusive in the nonwoven top sheet, knitted layer or layers of the thermal composites is preferably a shaped fiber such as the 4-8 deep groove polyester fiber or a variation of the shaped polyester fiber preferably, manufactured by the F.I.T Group or the like. A shaped (CCF) fiber by Clemson University or a Technofine polyester fiber by Gelanots may be an option in this layer. These technically engineered polyester shaped fibers provide channels for the moisture to travel along and transfer quickly to the exterior surface. The shaped fabrics may be combined with an active carbon compound such as that by Craghoppers or silica gel which increases the absorbent factor. Response Technology by Craghoppers is an option in this application for the inner lining polyester fibers and nonwoven and/or foam composites. A selection of shaped natural and synthetic fibers as well as polyester such as corn, acrylic, acetate and the like may be included in any layer in the moisture transfer system. The elastomeric cellular composite referenced in the U.S. Pat. No. 6,074,966 may include the selected nonwoven and shaped fibers discussed previously. Optionally, the moisture transfer, breathable, elastomeric composite may be used in place of the nonwoven top sheet on either side of the foam or thermal nonwoven or in place of the selected foam. In some performance categories the moisture transfer, breathable, elastomeric composite may be mechanically or ultrasonically bonded to the inner lining material abutting the foam, nonwoven or thermal nonwoven. The moisture transfer, breathable, elastomeric composite contains synthetic and natural fibers and foam. These fibers may be treated with wetting solutions and/or hydrophilic foam such Cofoam as well as that by Hydrophilix Inc. (U.S. patent application Ser. No. 09/823,129) The moisture transfer, breathable, elastomeric composite may be applied to the thermal nonwoven on either side or be mechanically or ultrasonically bonded to the thermal nonwoven. The moisture transfer, breathable, elastomeric composite may be attached or included in any layer in the moisture transfer system or may be in any layer in the moisture transfer system excluding the exterior shell fabric.

The Cofoam, breathable foam or the like may be used as the selected foam in the moisture transfer, breathable, elastomeric composite or be applied to any layer in the moisture transfer system. Cofoam may be used in place of the selected open cell foam or in combination with any layer in the moisture transfer system. The Cofoam may be combined with the thermal blend by Foss Manufacturing, INVISTA® thermal nonwovens such as THERMOLITE, Ultrathin or with 3M thermal nonwovens such as THINSULITE, nonwoven by Millennium or the like.

The nonwoven top sheet may be a dry-laid, wet laid, melt blown, spun bond or a needle punch product or a knitted scrum. The selected fibers, fiber construction and treatment of the nonwoven top sheet are a key element in the moisture absorption and transfer properties in the system. The nonwoven may or may not require a wicking solution or treatment. The product category and performance level determines the selection of treatment and the fiber or combination of is a wet laid apertured nonwoven top sheet.

The selected nonwoven top sheets are manufactured by INVISTA® (Sonatra Technology nonwoven), Alhstrom Nonwovens, Dexter Synthetics, Freudenberg nonwovens, Veritex, Nordlys, or the like. All nonwoven fibers in this application possess either active or passive moisture transfer abilities or both. The nonwoven blends may have elastic properties, polymer or silica microspheres or encapsulated PCM technology added with various fibers or fiber blends.

The preferable construction contains cooling and/or heating properties and elastine or SPANDEX® fibers. The Outlast melt spun fiber may be an option in this layer or in the thermal nonwoven layer. In some options the nonwoven fibers in the top sheet may be wrapped by another fiber or coated with hydrophilic foam spray. The foam and fiber composite, nonwoven fabric or the moisture transfer, breathable, elastomeric composite may be coated with a hydrophilic foam such by Hydrophilix or treated with Ultraphil, Coolfix or the like to increase the MVT function and the cooling or thermal application. Optionally, layer 20 may be eliminated when the hydrophilic foam, Cofoam by Hydrophilix or the like is applied or sprayed to the back of the inner lining fabric or material or to the abutting nonwoven. In fact, Cofoam, breathable foam or the like may be substituted for any foam layer in this application creating an extremely thin lining or outer lining moisture transfer composite. The inner lining fabric coated with Cofoam abutting the nonwoven or the nonwoven coated with Cofoam abutting the inner lining material may abut a spacer fabric, a cellulose material by Fox Run, a foam and polymer mesh composite or the outer shell fabric for use in several of the defined categories discussed in this application.

However, in a number of categories the nonwoven abutting the inner lining fabric or material in layer 10 or foam in layer 20 is a thermal spun bond, melt-blown or needle punch product. The preferable thermal nonwoven is a needle punch product by Foss Manufacturing containing a blend of deep groove polyester fibers, silver fibers and natural or synthetic fibers. The nonwoven composite developed by Baychar Technologies and manufactured by Foss Manufacturing referred to as the Foss composites is constructed of a number of layers and contains fibers such as elastine or SPANDEX®, lyocel, PVA, silver fibers, shaped, hollow and/or grooved polyester or like or a blend needled together with or without foam. Alternatively, the nonwoven composite developed at Foss Manufacturing may be constructed with a nonwoven thermal by INVISTA® such as Ultralite, THERMOLITE or the like or the Foss composite may have a 3M nonwoven included such as THINSULITE 100, 200, 300 or the like. These composites transfer moisture and thermally regulate the product by increasing or decreasing the fiber content or treated fibers. Of course, Invista, INVISTA®, 3M and Foss nonwovens may be used in place of the moisture transfer nonwoven composite developed at Foss Manufacturing LLC. in any layer between the inner material and outer shell fabric.

The selected nonwoven thermal, shaped, hollowed or grooved fibers optionally may be flocked to the back side of the inner lining material, the exterior shell fabric or to any foam, foam composite such as the moisture transfer, breathable, elastomeric composite, breathable membrane, thermal or thermal composite containing shaped and hollow fibers with or without a foam layer or polymer layer treatment. Fibers may be flocked as well to the foam inclusive of the nonwoven fibers, nonwoven sheet or polymer mesh. The flocked fiber or blended fibers optionally may be flocked to both sides of the nonwoven, breathable membrane, breathable adhesive or open cell foam. The thermal nonwoven, THERMOLITE INVISTA® or THINSULITE by 3M optionally may be attached to the foam inclusive of the fibers or polymer mesh or both or may included a foam layer.

The previously mentioned, aperture nonwoven alternatively may be mechanically bonded to the foam layer in 20, 30, 50 on one side or both sides. Optionally, the apertured nonwoven and breathable foam composite combination may be combined with the thermal nonwoven, nonwoven composite with or without a foam material or a flocked composite blend applied to the wet, dry polymer laid nonwoven or foam surface. In some options the nonwoven, foam and polymer mesh layer may be needled or ultrasonically bonded to the thermal nonwoven. The preferred hydrophilic foams are developed by Dicon Foams, Vita Olympic, Hydrophilix, Rubberlite, Lendall, Dynamic, Alpin foams or Foamex foams distributed by Rogers Corporation or the like.

The breathable, foam or foam and nonwoven laminated or welded combinations in layer 20 or 30 as previously suggested may be optionally replaced by a needle punched nonwoven with or without foam, preferably the Foss composite or by the moisture transfer, breathable, elastomeric composite having a foam fused with nonwoven fibers formed in a single process.

The inner liner fabric is a moisture transfer fabric capable of wicking moisture. The inner liner 10 is preferably constructed using specific fabrics possessing certain desired characteristics, but with varying fiber compositions. A list of fabrics which can be employed depending upon the individual needs of their application as well as the individual needs of each skater are provided below. These fabrics may be used either individually or in combination. The following inner moisture transfer liner 10 materials may also be replaced by new moisture transfer fabrics with similar characteristics as the technology on the market develops for this invention. The technical engineering of several fiber constructions and combinations is employed in this application. A flocked fiber blends may be added to the back of the inner lining or shell fabric material.

The multi-faceted shaped polymer based synthetic and natural fiber blends lend endless possibilities in construction to the first layer. These new shaped fibers increase moisture transfer, cooling and heating applications and increase performance levels. Moisture transfer rates and thermal properties vary with the performance criteria.

The first fabric or nonwoven is a moisture transfer material capable of wicking moisture. These fabrics and materials may be treated with wicking solutions to increase the moisture transfer rates. The inner liner 10 is preferably constructed using specific fabrics possessing certain desired characteristics. The fiber blends and construction may vary with the products and performance needs.

A list of fabrics which can be employed depending upon the individual needs of each skater are provided below. These fabrics or nonwovens may be used individually or in combination. All fabrics or nonwovens in the first layer may be treated with a wicking solution such as Coolfix, Ultraphil or the like and must provide active as well as passive moisture transfer capabilities. Fabric or nonwoven construction, fiber selection and MVT surfactants and/or coating may be employed in multiple combinations in this first layer 10 to increase the transfer rate. Optionally the first layer is a multi-tiered construction containing flocked fibers on the back of an elastomeric or needle punch nonwoven. The first layer alternatively may have fibers flocked to the back side of the inner moisture transfer fabric or nonwoven lining material abutting the foam layer, foam and nonwoven blend or a nonwoven layer. This multi-tiered construction absorbs and transfer moisture and may be treated with a cooling microsphere coating or spray or chemical option. The inner lining material may further include an active carbon compound to increase the moisture transfer as well as shaped and silver fibers.

The following inner moisture transfer liner materials may also be replaced by new moisture transfer fabrics with similar characteristics as the technical textiles technology on the market develops for this invention.

The first fabric is an anti-microbial, anti-fungal polypropylene (also referred to as polyolefin) containing LYCRA®, blend (2%) with INNOVA fiber, elastine or SPANDEX® fibers or the like. INNOVA is a continuous filament fiber (manufactured by Coville, Deercreek fabrics.)

The second fabric is an anti-microbial, anti-fungal polypropylene, polyester or polyester blend having a polyester or cotton, corn or lyocel backing or the like (such as that manufactured by Coville, Inc. This fabric has the face of one fiber and the backing of another and may vary in composition depending on the performance level of the skater.

The third fabric is an anti-microbial, anti-fungal polypropylene/cotton blend with ALPHA fiber, or the like (such as that manufactured by Intex Fabric, Inc.)

The fourth fabric is a Field Sensor® polyester with waffle-weave construction (such as that distributed by Yagi & Co., Inc. and manufactured by Toray). This fabric is constructed to transfer moisture immediately away from the foot and performs best as the liner for the soft-boot in-line skate. Alternatively, a polyester material known as Aqua-Dry®, distributed by Teijin Shojin can be employed or the like.

The fifth fabric is a Technofine polyester shaped fiber by Gelanots.

The sixth fabric is 3×Dry process fabrics or by Schoeller.

The seventh fabric is a two-layered fabric by Feron Ice process on a synthetic or natural fiber or a blend of natural and synthetic fibers.

The eighth fabric or nonwoven is made from corn fibers or a blend of corn fibers with one or more of the following fibers, elastine or SPANDEX®, lyocel, acretate, PVA and polyester.

The ninth fabric is polyester fabric with an active carbon compound bonded to the polyester by a fabric Craghoppers.

The tenth fabric group are fabrics by Burlington Technologies contain Nano-Technology called Nano-Dry Fabrics.

The eleventh fabric materials is a synthetic leather preferably by Nextec of Italy, SISA or Clarino.

The twelfth fabric Technofine polyesters by Gelanots.

The thirteenth fabric is a Dri-release fabrics by Optimer Performance fibers.

The fourteenth fabric is Dri-line and Sphere Technology fabrics by NIKE.

The fifteenth fabric is Polyguard guard by KOSA.

The sixteenth fabric group is Dry-tech Comfort System fabrics by Westcot.

The seventeenth fabric group are Thermal Pro Fabrics by Malden.

The eighteenth fabric group is the Gore Windstopper N2S.

The nineteenth group is Polartec Powerdry.

The twentieth fabric is a fabric called Aquafil Dryarn by Rhovyl in France and Italy.

The twenty-first fabrics Sterling Performance fabric.

The twenty-second fabric is Dryline by Milliken.

The twenty-third fabrics are corn fibers and fabrics by Draper Knitting.

The twenty-fourth fabric is Acrillian or Duraspun by Monsanto.

The twenty-fifth fabric is a hydrophilic, anti-microbial Dri-Lex Baby Kid or perforated material (such as that manufactured by Faytex Corp.).

The twenty-sixth fabric is a polyester looped terry (such as that manufactured by Fronfli Spundale Mills, Inc.).

The twenty-seventh fabric is a suede/sanded polyester micro-fiber material (such as that distributed by Yagi & Co., Inc. and Teijin Shojin, Inc., Millken or Malden Mills).

The twenty-eighth fabric is an anti-microbial, anti-fungal PolarTec Series 2000, which is a wickable, moisture transfer fiber, containing LYCRA®, elastine, SPANDEX®, polypropylene, or the like.

The thirtieth fabric group are Sensitive Fabrics.

The thirty-first fabric are polyester fabrics by Coville.

The thirty-second nonwoven fabric is Evolon® nonwoven by Freudenberg.

The thirty-third fabric is nonwoven moisture transfer wool composite blend by Foss Manufacturing.

The thirty-fourth nonwoven inner lining selection is Evolon® a split fiber technology and process and Novolon® technology, a product by Freudenberg with or without stretchable properties. The Evolon® and Novolon® may have a suede or brushed surface. The invention further includes all up-grades to the split fiber technology and process for Evolon® and Novolon® products by Freudenberg, the Nonwoven Cooperative at NCSU or the like.

Nano-technology may be applied to any selected shell fibers, nonwoven or fabric to enhance moisture transfer or to waterproof the exterior shell material. Nano-technology by Burlington Technologies or Toray Industries is preferable. The selected exterior material is breathable, moisture transfer and waterproof. The selected rates of functionality are determined by the product and the performance level of the product. The breathable and moisture transfer rates are not ambiguous or underdetermined. The selected nonwovens and fabrics have determined rates that can be increased or decreased with the applied technologies and selected performance needs of the product line. Fabric or nonwoven vender supplies product rates at the request of the product company. Enhancing and additional technology varies the rate of functionality per product group.

Any of these fabrics and nonwoven top sheets may have the selected nonwoven fibers flocked to the back surface or may be laminated to a foam that has the nonwoven fibers flocked into the back of the foam. The additional flocked surface of moisture transfer fibers and optional anti-microbial properties allows increased functionality in the single layer material. All of these fabrics have good moisture transfer characteristics which prevent damage to a skater's or snowboarder's foot by preventing excessive moisture build-up. The moisture transfer inner fabrics may vary in composition and structure in this liner system as fiber technology advances.

This application constructs the following inner lining composite constructions. As stated previously, all inner lining materials and fabrics are laminated, needled, stitched, ultrasonically bonded, adhesively bonded or mechanically bonded to the abutting nonwoven or foam material. The inner lining materials or fabrics may be selected from the previous list.

The first is an inner lining fabric or material abutting an open cell, hydrophilic foam laminated or needled to a nonwoven material.

The second is an inner lining fabric or material abutting an open-cell, hydrophilic foam where the nonwoven fibers have been flocked into the back of the foam, inner lining fabric or breathable membrane between the inner lining material and foam.

The third is an inner lining material or fabric with an elastomeric cellular composite such as that referenced in U.S. Pat. No. 6,074,966 which is mechanically or ultrasonically bonded to the inner lining material.

The fourth is an inner lining material or fabric abutting a open-cell, hydrophilic foam with the elastomeric cellular composite mechanically or ultrasonically bonded to the foam layer on either side or on both sides.

The fifth inner lining composite construction is an inner lining material or fabric abutting a Foss nonwoven composite constructed of one or more of the following fibers, polyester (preferably 4 Deep Groove by F.I.T. or a variation by Foss Manufacturing), lyocel or acetate, corn, wood pulp cellulose and silver fibers.

The sixth is an inner lining fabric or material with the foam and nonwoven fibers flocked into the back surface.

The seventh is an inner lining fabric or material abutting a foam layer. The foam is inclusive of a nonwoven layer or fibers.

The eighth is an inner lining fabric or material abutting a moisture transfer, nonwoven spacer material. Variations of the inner lining composite are on going and are suggested in multiple combinations. The intent of the moisture transfer system is to provide a complete technical solution in an extremely thin increment to accommodate the comfort needs of the user.

All of the above composite options are presumed breathable and transfer moisture. The inner lining composite abuts second open cell hydrophilic foam, nonwoven composite of foam and nonwoven and/or a thermal nonwoven, a spacer fabric or polymer mesh and the exterior shell fabric and/or material, skeletal polymer shell or a combination of one or more. A breathable membrane may be inserted between the exterior shell fabric and the nonwoven, spacer product, cellulose material, polymer mesh or foam layer.

In one option, a combination of breathable, foam and nonwoven, a foam and a thermal nonwoven or a foam and spacer fabric or polymer mesh are positioned in layer 30 abutting a spacer fabric, cellulose material or exterior shell material. The above combinations are suggested for use in ice and hockey skates, protective gear, helmets and accessories such as gloves.

The moisture transfer characteristics of the inner liner composite allow moisture vapors to be passed from a skater's or snowboarder's body through the inner liner 10 where it then comes into contact with the first foam material 20. The moisture vapors travel through the first foam material 20 and come into contact with the abutting nonwoven, foam, spacer or cellulose material 30. In some performance categories the aperture nonwoven may be eliminated between layer 20 and 30 or the foam in layer 30 may be a spacer fabric or thermal nonwoven product or composite is applied. The spacer fabric and thermal nonwoven are optional as well in layer 30 and are used to provide comfort and warmth. In the thinner applications such as in the hockey and ice skate, the inner lining composite abuts the outer shell fabric and polymer shell. The performance category determines the materials and combination of materials in layer 30.

In another liner option consists of an exterior shell fabric, a frothed, breathable, open cell foam or free rise foam abutting a nonwoven or nonwoven thermal layer preferably by Foss Manufacturing, Invista, INVISTA®, 3M or the like and the inner lining material. The breathable foam layer may contain fiber and/or a polymer mesh. Phase Change Technology may be added to the selected nonwoven, flocked fibers or composite or a nonwoven by Outlast, Freudenberg, Alhstrom, Kimberley Clark or the like Wisconsin Global may be used abutting the exterior shell fabric material As discussed above, first foam material 20 may be a moisture transfer, breathable, elastomeric cellular composite comprised of a layer of germicidal, anti-microbial, open-cell hydrophilic, polyurethane foam such as Foamex foams (VPF, Aquazone®), Dicon foams or the like and a non-woven top sheet. Alternatively, a frothed polymer and fiber combination made in one process can be used in this layer or others All of the foam materials discussed herein are preferably breathable, open cell, free rise foam, slap foams, frothed foams or foamed coatings made of polyurethane, although not specifically mentioned each time. The inclusive top sheet is preferably composed of wood pulp, rayon, elastine or SPANDEX®, corn, cotton, lyocel, PVA, silver fiber, polypropylene, polyester, or a combination thereof.

Alternatively, foam material 20 can be a foam layer that is separate from the non-woven top sheet and is attached to the non-woven top sheet by lamination, stitch bonding, adhesive or the like. The non-woven top sheet (when used) with or without elastine or SPANDEX® fibers abuts the next layer of 1/16-1/4" reticulated and/or open cell hydrophilic foam, or second foam material 30. The second foam material 30 (when used) may also be a breathable, germicidal, anti-microbial, reticulated and/or open cell hydrophilic 1/16/ 1/4" foam such as Aquazone with or without surfactants, wicking solutions and/or PCM Technologies, Sphere Technology applied or Comfortemp. The first layer 20 or the second foam material in layer 30 may contain a moldable mesh such as that developed by Naltex or Conwed in some embodiments. The polymer mesh inclusive in the open cell foam or laminated to the open cell foam can be in applied to any foam layer in this moisture transfer system. The foam may also include a fiber or a group of fibers as well as the polymer mesh. The second foam material is preferably intergraded or backed with a non-woven top sheet as mentioned above. In fact, any of the foam materials discussed herein can be intergraded or backed by such a non-woven top sheet or an elastomeric nonwoven may be applied. The non-woven top sheet is not necessary and can be removed in a number of options. Also, many of the foam materials are interchangeable depending upon specific needs of the skater. The nonwoven apertured top sheet is comprised of cotton, wood pulp, lyocel, silver fiber, PVA, polypropylene or polyester or a combination thereof.

The previous fibers may be flocked into the back of the foam layer 20, 30, or 50 or additional layers. A nonwoven layer, moisture transfer, breathable, elastomeric composite or thermal nonwoven composite may be combined with the foam layer and flocked fibers and foam layer or flocked fibers and inner lining material.

One preferable embodiment for a hockey skate moisture transfer liner combines the inner lining material laminated to a foam layer with flocked fiber backing the inner lining or foam and a spacer fabric or polymer mesh and the exterior shell fabric.

Figure 2:
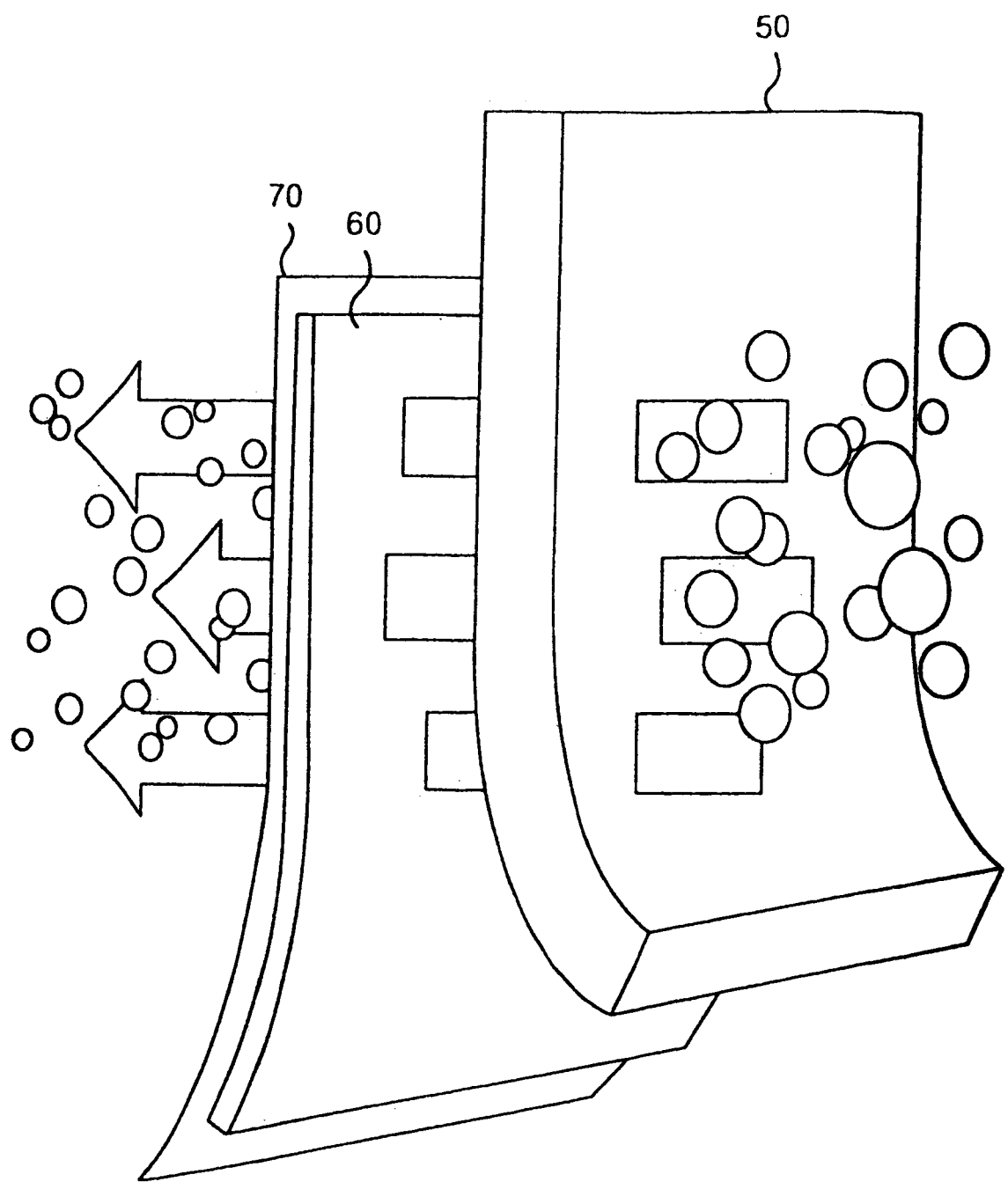
FIG. 2 illustrates a second portion of the liner according to a first embodiment of the present invention.

As shown in FIG. 2, a third foam material 50 provides support and has similar characteristics to the second foam material 30 Layer. Layer 30 allows the moisture vapors to continue their movement to the outer layers of the composite or shell layer if the shell has a breathable exterior layer. Optionally, the foam may contain a polymer mesh. The layer 50 is a slow recovery moldable foam (by Poron or Foamex), or a polyurethane reticulated and/or open cell hydrophilic, anti-microbial foam or a spacer material that functions like a moldable foam and is composed of polypropylene and polyester or a breathable foam high density foam by Rubberlite. The spacer fabric is formed in certain areas to take the shape of an ankle, heel pocket, and foot bones. Layer 50 is optional and is based on the needs of the product and performance level. The spacer fabrics are engineered with fibers that increase moisture transfer movement. Layer 50 may abut layer 20 in some performance categories. An air bladder may also be added in the area around the ankle in place of the third foam or spacer fabric material. Layer 50 may be a combination of a moldable foam and spacer fabric shaped to aid in performance and support. The air bladder may be inflated by pumping the reflective grip 410 just under the pull tab. An air bladder may be added in the tongue or toe area or in the cuff. Furthermore, spacer fabrics may also be used in place of the foam or bladder 50 in the tongue. The moldable polyester, polyamide, polypropylene spacer materials may be such as those manufactured by Muller, Schiebler, Peltzer or Fugafil or the like in varying combinations. The environmental acceptability of many foam materials is an important factor to consider when selecting the proper materials. Material 50 is positioned so as to allow the moisture to pass through into subsequent elements, such as waterproof/breathable membrane 60 and the outer shell 70, or an encapsulated outer fabric of the overall lining system.

The outer fabric may also be treated with a waterproof film and may be combined encapsulated technology. The third foam, cellulose material, foam composite or spacer material 50 can be designed to provide a well defined heel lift and heel pocket. The pocket may also contain a silicon gel, moldable foam, frothed foam, air or an open foam, nonwoven, or cellulose material with or without PCMs. The pocket is optional and may be removable in some applications. This invention enables improved performance with the increased support around the heel, toe and ankle. The toe box is from top to bottom, wider and more flexible than in previous liners, specifically those described in U.S. Pat. Nos. 5,092,614, and 5,397,141. The laminated foams under the heel support the skater's lower back and allow for a comfortable stride. With this added comfort, the aggressive or recreational skier can achieve a higher level of continued performance.

Figure 3:
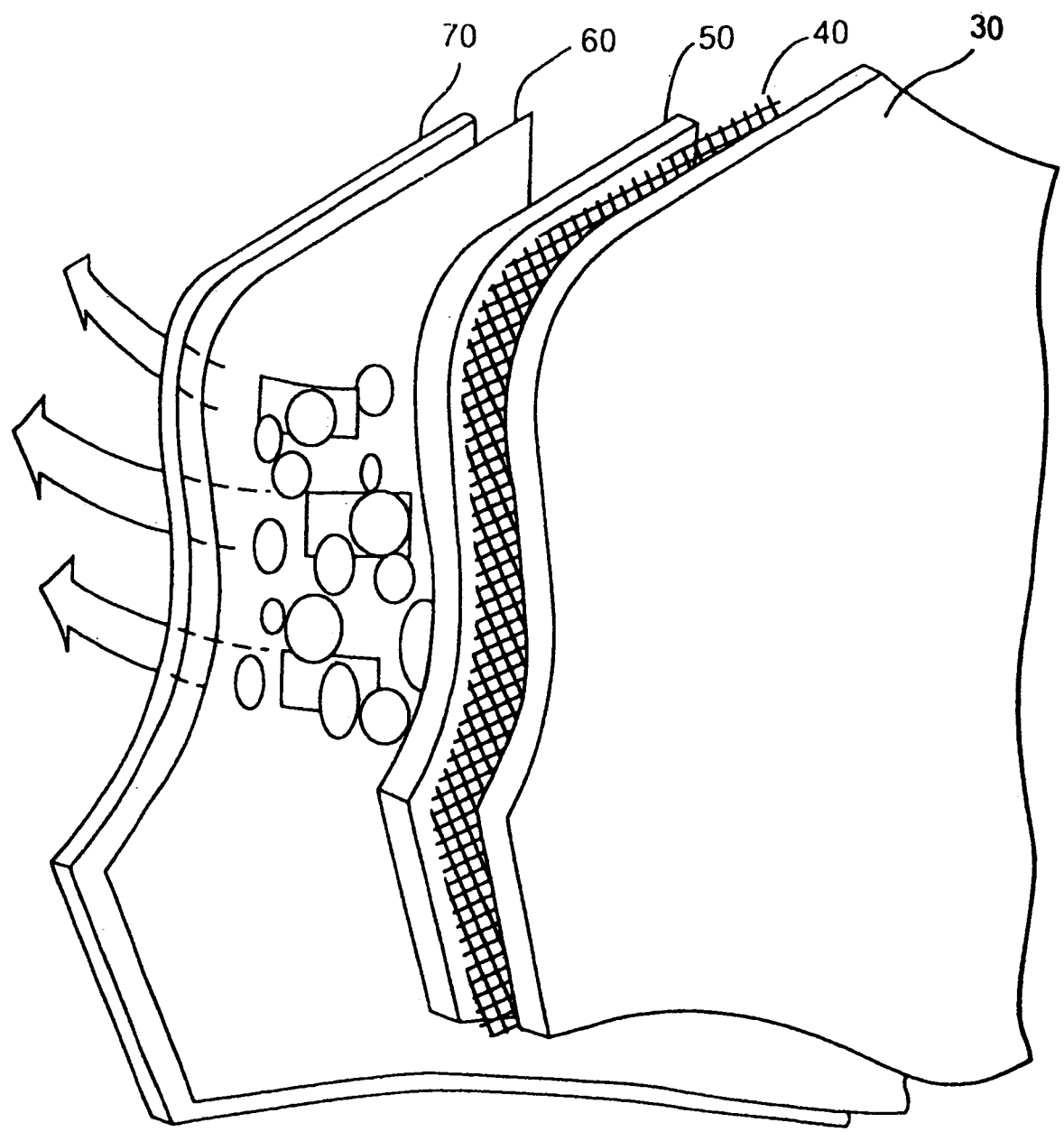
FIG. 3 illustrates an example of the liner according to the first embodiment of the present invention.

As shown in FIG. 3, between the supporting second foam material 30 and the third foam material 50 is a structural mesh 40 which can be a flex guard, for example, such as one manufactured by NALTEX or Conwed Plastics, or the like, that adds structural integrity to the lining system. This polymer mesh, as discussed above, may be included on or in any foam layer. A suggested combination for the ice and hockey skates would combine the polymer mesh in the foam abutting a thermal nonwoven or abutting the nonwoven composite by Foss Manufacturing or the like. The multiple layers of foam and nonwoven increase rebound and comfort levels. The nonwoven and nonwoven anti-microbial silver fibers or the like fibers or anti-microbial treatment may be added in some performance categories to the foam and mesh composite.

A nonwoven thermal may be a THINSULITE by 3M thermal nonwoven, THERMOLITE by INVISTA® thermal nonwoven, Ssoftherm by Foss manufacturing, or a nonwoven composite with or without foam. A shaped and/or grooved polyester or synthetic fiber nonwoven blend may be combined with one of the selected thermal nonwoven with or without an additional foam layer. Alternatively, the nonwoven composite suggested previously may be a nonwoven fibers and foam layer combined under water or air pressure. The foam layer may be optionally contain elastine, silver or moisture transfer and/or absorbent fibers, a polymer mesh or a combination in a number of performance categories. Alternatively, in one option the foam layer is combined with the fiber or a polymer mesh may have moisture transferring fiber blend flocked to the face side of the foam composite layer or the foam composite may have both sides flocked in some performance categories. The flock blend additional may include nano-technology for soil resistance and anti-microbial properties. This option is recommended for technical climbing footwear, protective gear or apparel.

A moldable foam layer, spacer material or gel or the like may also be used in place of this Flex-guard polymer mesh by Naltrex or the like and the foam composite combination or an air bladder around the heel, toe, cuff or ankle areas. The moldable foam may or may not be a high density, slow recovery foam by Rogers, Rubberlite or the like. If it is not very breathable, it can be made breathable by puncturing. Alternatively, the moldable foam is preferably similar in construction to the second foam material and can be a polyurethane reticulated and/or open cell hydrophilic, anti-microbial germicidal foam approximately ¼ inch thick (for example Aquazone, Netsorb, Dri-z by Dicon, Hypr-cell by Rubberlite, Comfortemp nonwoven combined with a foam layer, or the like). A non-woven top sheet (with or without apertures) can be attached to the moldable foam. If a moldable foam or spacer fabric is used, then the second foam material may be omitted. Also, the moldable foam can be Aquazone.

As mentioned earlier, the third foam material 50 is preferably similar in construction to the second foam material, namely being either germicidal, reticulated and approximately $\frac{1}{16}$", $\frac{1}{8}$" or $\frac{1}{4}$" thick or being germicidal, hydrophilic, and open cell (for example, Aquazone). This material is preferably laminated to a nonwoven top sheet (which may or may not be apertured) comprised of wood pulp, rayon, cotton, corn, silver fibers, lyocel, polyester, polypropylene, or a combination thereof. The nonwoven or knitted top sheet maybe applied to either side of the foam, spacer fabric or thermal nonwoven to increase moisture transfer. The fibers selected for the nonwoven top sheet may be also used for the flocked fiber blend and be flocked to the any fabric, nonwoven, foam, breathable membrane or spacer material in this liner system. The nonwoven top sheet, when used, abuts the waterproof/breathable membrane 60 and the polymer shell or a combination of fabrics and/or materials and polymer. The nonwoven top sheet may abut an encapsulated outer shell fabric combined with a polymer shell or a combination. An example of a combined fabric and polymer shell composite is the soft shell boot and polymer shell is the Rossignol soft alpine boot or the K2 in-line skate. The exterior shell material is waterproofed with nano-technology, encapsulation, DWR finishes or films, coatings or breathable membranes or ionized treatments.

The suggested nonwoven top sheet fibers maybe flocked on to the foam layer, inner lining material, moisture transfer, breathable, elastomeric composite, breathable membrane or spacer fabric to increase moisture transfer, waterproof and anti-microbial properties.

The anti-microbial flocked fiber composite may be applied to any layer in the composite system.

The nonwoven apertured, top sheet may be optionally mechanically bonded to the thermal nonwoven, foam or to the thermal nonwoven and foam composite to increase the rate of moisture transfer.

The outer shell fabrics may also be treated with waterproof film and finishes or encapsulated fibers or fabrics in some performance categories. The waterproof encapsulated outer shell fabrics eliminate the need for a waterproof/breathable membrane in most categories. However, the breathable membranes such as Gore, Event or the like maybe combined in this application with encapsulation, finishes, films, or coating in some performance categories. In fact, composites of flocked foams fibers or fabrics or nonwoven moisture transfer thermals may be abutting a breathable membrane like Gore, Event, Aquador or membranes by Brookwood or the like. The outer fabrics may also be constructed to repel water with breathable membranes, encapsulated fibers or fabrics, a breathable film or coating. The selected coating and films are breathable and may be used independently or combined with a breathable membrane in some performance categories. The waterproof encapsulation is preferably by Nextec. Nextec is the owner of the Canadian patent CA 1338232 and 593680 application the U.S. Pat. Nos. 4,666,765, 5,004,643, 5,418,015, 5,209, 965. The patent documents are hereby incorporated by reference. Encapsulation by Nextec, Toray, ASF and others may be developed in any layer in this moisture transfer system. Preferably the encapsulation is applied to the outer shell fabric listed in this application. Encapsulation by Toray, ASF and others wraps the individual fiber or thread in a polymer base coating. Encapsulation by Nextec coats an internal layer creating a silicon-coated woven fabric substrate (U.S. Pat. Nos. 5,418,051 and 5,209,965). Encapsulation allows the moisture vapor to travel around and through the woven, knitted, nonwoven shell fabric, material or elastomeric or combination.

Figure 4:
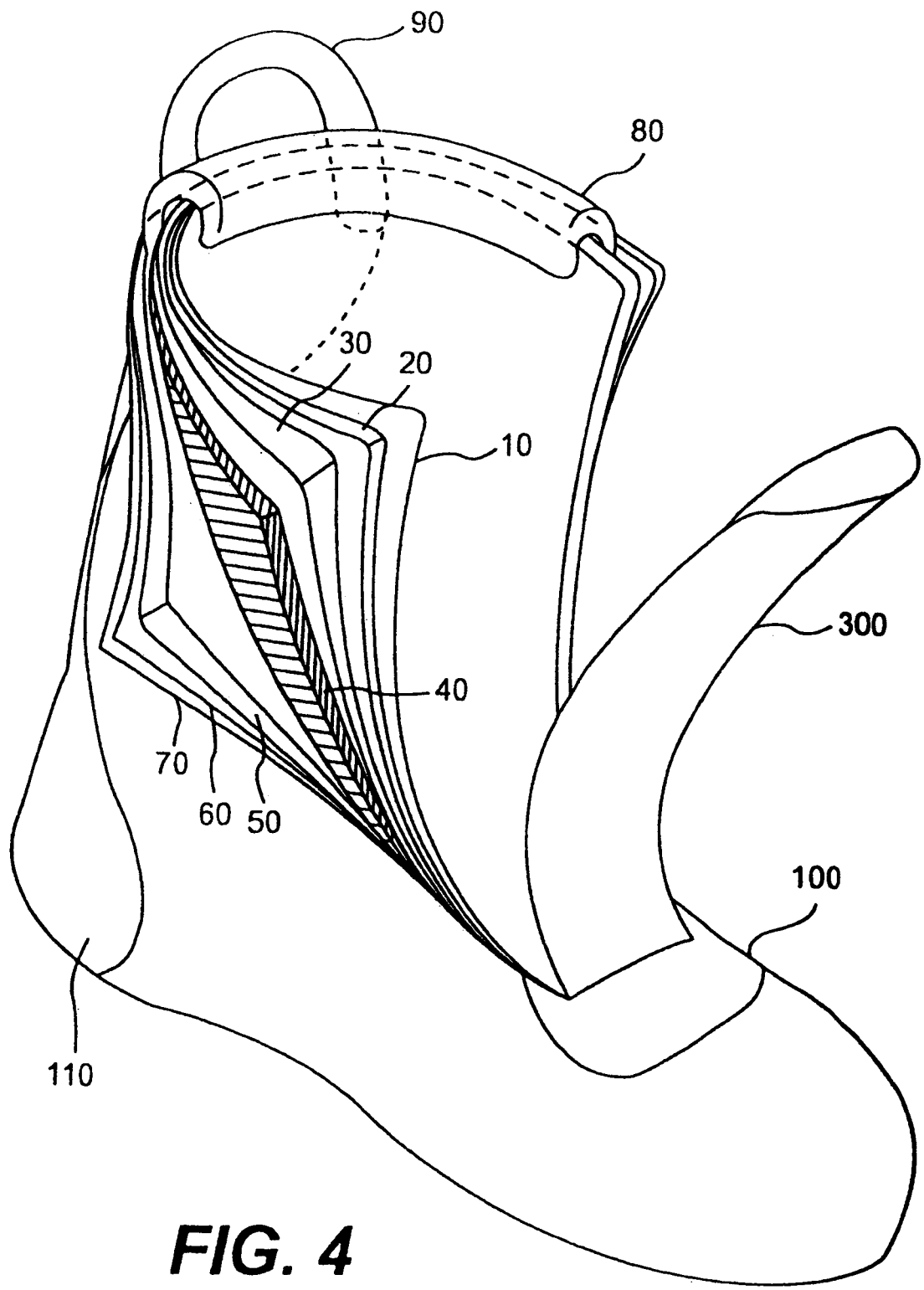
FIG. 4 illustrates the liner shown in FIG. 3 as applied to an inline skate.

The moisture vapor continues from the second breathable foam material 30 when applied through the mesh or spacer if applied 30, and on through the third exterior foam material 50, nonwoven layer or outer shell material. In some performance categories the spacer fabrics or thermal nonwovens can replace the layer of foam material 50. The moisture vapors are then passed through to the waterproof/breathable membrane 60 or shell material constructed of encapsulated other fabrics, or the like. If the outer fabric is encapsulated, then the moisture vapors pass around the encapsulated fibers and onto the surface fabric. If the liner employs a waterproof/breathable membrane, then the moisture vapors are absorbed into the membrane and passed through to an outer layer of fabric 70, as shown in FIG. 4. The waterproof/breathable membrane 60 can be selected from a variety presently available on the market.

Those under the tradenames, Aquador, Entrant Dermizax, Witcoflex, Harrison Technologies membranes, Event, Super Dry Film, Windstopper membrane, Dry comfort, Outdry, Active comfort, Sympatex Windler, Sympatex Elastic, Drytrail, Eclipse, Endurance, Vapex, 2000/Plus/Standard1300, Seco-Tec, Dermizax, Thintech, Lay-tek, Witcoflex Ecodry (by Baxenden Chemical),TX-1540, Outdry, Gore membranes, and PTFE by Tetratec are currently being considered. However, the membranes currently being considered are Aquador, Event and Harrison Technologies. A breathable membrane may be combined with a thermal nonwoven such as THERMOLITE, THINSULITE, Ssoftherm or the moisture transfer nonwoven and foam thermal composite disclosed in this application. Outlast fibers which regulate temperature may be combined in some options with the nonwoven Outlast/®/Invista® products or other nonwoven blends or foam in this application. If the preceding foam layers are have PCM Technology applied or included in the foam, the Outlast (PCM's) fiber or membrane may be eliminated. These waterproof/breathable membranes are ultra-thin, skin friendly, moisture barriers that allow moisture vapors to escape while preventing outside water from penetrating. Outlast Technology is a Phase Change Technology coated to a membrane, a spun melt fiber or a coating applied to a fabric, foam or nonwoven surface and is manufactured by Gateway Technologies, Freudenberg or Schoeller Textil. Phase Change, micro-encapsulation technology, can adjust to temperature changes and is added to foam. The Phase Change Technology can be combined with nano-technology to cool and transfer moisture in a number of options. Phase Change Materials can be added to a foam layer or adhesive or foamed dot matrix which is applied to a fabric or foam surface or the Phase Change materials may be added to a coated binder and applied foam layer. PCM materials may be further added to foamed adhesive or binder be sprayed to any material surface or fiber. PCM Technology can be added to any fiber, fabric, foam, foam and nonwoven composite, thermal, breathable membrane or flocked fiber blend in this application. Freudenberg Comfortemp nonwovens may be applied to any layer in this composite system or be combined with other nonwovens or foams in this moisture transfer system. The Freudenberg nonwovens or Freudenberg Comfortemp products (W) 02/12607) may be mechanically bonded into the foam or nonwoven layer in this composite system to increase the thermal applications.

A number of patents have been issued to Triangle Research & Development Corp. disclosing the details related to the processes now being employed by Gateway Technologies and Schoeller. For example, U.S. Pat. Nos. 4,756,958 and 5,366,801 are directed to fibers and fabrics with reversible enhanced thermal properties, respectively. The disclosures of these two patents are hereby incorporated by reference. Other patents assigned to Triangle Research & Development Corp. that are related by subject matter and have overlapping inventorship, include U.S. Pat. Nos. 5,415,222; 5,290,904; and 5,224,356. These patents are also hereby incorporated by reference.

Another patent, U.S. Pat. No. 5,499,460, which has overlapping inventorship with the above-mentioned patents, is directed to a moldable foam insole with reversible enhanced thermal storage properties. The disclosure of this patent is hereby incorporated by reference, and is illustrative of one type of moldable foam that can be used as mentioned herein.

Also shown in FIG. 4 is a protective rim or cuff 80, preferably made of neoprene covered by LYCRA® or elastine or SPANDEX® materials. Also, a germicidal hydrophilic, open cell and/or reticulated foam by Foamex or Vita Olympic, for example, can be used. A pull tab 90, preferably made of nylon, is connected to the protective rim 80. An abrasive protective material 100 is provided adjacent to a tongue 300. Another abrasive protective material 110 is provided around the heel portion of the shoe. Abrasive protective material 110 is supplied by Schoeller or INVISTA®, Invista, for example.

The outer layer of fabric 70 of the lining system has 200 to 6000 denier strength and is made waterproof by a membrane, encapsulation technology or a waterproof film. If the waterproof film is applied to the outer fabric, then the membrane or encapsulation technology may be omitted. Encapsulation technology is being utilized by a company called Nectex, Inc. (U.S. Pat. Nos. 5,004,643 and 4,666,765) or Toray, Inc., (a Japanese company or the like). The breathable membranes preserve the outer layer of fabric 70 and perform as a waterproof barrier for the liners. If the encapsulation technology is applied to the outer layer of fabric 70, then the breathable laminate membranes need not be used. The encapsulation technology regulates the degree of waterproofing and breathability of the outer fabric shell by encapsulating an internal layer of fibers within the outer fabric. When the encapsulated fiber layer is close to the fabric surface, the fabric is very waterproof and less breathable. If the layers of encapsulated fibers are in the middle of the outer shell fabric, then the fabric is equally waterproofed and breathable.

The outer layer of fabric 70 is a combination of extremely durable, lightweight materials, Kevlar®/Keprotec products 13207, 13624, 6500, 14705, 65563, 13602, 13408 (manufactured by Schoeller, Inc.), the Schoeller Spirit Line 14138, 14118, 14140, 14120, 14124, 14126, 14128, 14134, 14642, 14643, 14641, 14645, 14636, 14637, 14122, 14132, 14640, Kelvar® and nylon fabrics by Nam Liong, nylon supplex (such as that manufactured by Travis Textiles, Inc. or Blank Textiles, Inc.), nylon Cordora® (manufactured by Schoeller, Inc.), other Cordoras (manufactured by Schoeller or INVISTA®), Maxus 6-ply (manufactured by Blank Textiles, Inc.) or Starlite Dri-lex nylon fabric (manufactured by Faytex Corp.), Mojave or Tudor (both manufactured by Travis Textiles, Inc.), Microft (manufactured by Teijin), Entrant Gil and Dermizax (both manufactured by Toray), Gymstar Plus (manufactured by Unitika), Ultrex High Performance Fabrics (manufactured by Burlington, INVISTA®, Invista, Schoeller, or the like), Nextec synthetic leathers and nonwovens or the like or the like, or other fabrics having similar characteristics as these new products.

Nonwovens by Sontara Technologies or the like can be used in combination with outer fabrics and are not to be confused with the nonwoven top sheets attached to the inner foam materials. Instead, this is a high abrasion, moisture transfer, absorbent material that is a spun lace (polypropylene) moisture management product, such as Sontara Technology nonwoven manufactured by INVISTA®, Invista, or nonwoven by Freudenberg for example.

Selecting the proper materials depends upon the needs of each individual skater. The non-abrasive cool fabrics used in the inner liner of the present invention greatly reduce the possibility of trapped moisture, thereby protecting the foot from fungus growth and any damage. The more aggressive skaters or snowboarders need a moisture transfer liner that can remove large amounts of moisture continuously from the foot. These skaters or boarders often do not wear socks, and as a result, calluses, abrasions and blisters become commonplace. A wetting agent may be applied to any of the inner lining materials 20 to enhance the moisture transfer away from the foot. The anti-microbial, anti-fungal polypropylene (polyolefin) fabrics quickly remove moisture away from the foot. Skin damage is minimized because the polypropylene fabric has a smooth, continuous surface. This fabric also prevents bacterial build-up which can cause foot odor and fungus.

The looped polyester terry blend or the like is an excellent wicking fabric and can remove moisture rapidly. A wetting agent by Witco, or the like, may be applied to enhance wickability.

The anti-microbial, anti-fungal Dri-lex nylon and nonwoven fabrics blends are sanded and soft. The material not only removes moisture away from the foot, but is also extremely comfortable and cool to the touch.

The polyester Field Sensor fabric or Intera treated polyesters, polyester blends or the like works well with those individuals who prefer sport or recreational skating. This liner absorbs moisture immediately and is recommended for the soft boot inner liner.

Finally, polyester microfiber fabric is advantageous in that it is cool to the touch, smooth and wickable. A wetting agent treatment enhances wickability.

As a result of using this lining system, the skater continues to have a cooler, drier foot. The lightweight Kevlar®, Starlite, and Cordura®, or the like, outer liner materials are twice as durable as the former heavyweight nylons often used on the outer shell, but function as a softer feeling, breathable outer surface and aid in the moisture transfer.

FIGS. 5(a) and 5(b) illustrate a sole portion 200 of a footpad covered with one of the selected fabrics such as CAMBRELLE® Dri-Lex nylon, Evolon® or Novolon® technology by Freudenberg, polyester blends or the like. Preferably, however, the foot pad is designed using a nonwoven, flocked fibers or Coville fabric. The top sheet is backed by flocked fibers, a Foss nonwoven composite, a hydrophilic moldable nonwoven or foam. The footbed insert protects the foot from abrasion and friction burns. The inserted hydrophilic anti-microbial foam (an open-cell moisture vapor transfer foam) or slow recovery punctured foam foot pad adds support and transfers moisture downward. The bottom portion of the foam is preferably provided with a nonwoven to sheet or flocked fibers as described earlier, a material called SaranClimate Insoles by Fugafil or Sumuntez 1, 2 by Textel may also be used in place of the foam composite foot bed. The heel pocket foam or gel protects the back of the heel with a double layered, breathable, reticulated and/or slow recovery moldable foam or a breathable cellulose material. This cushion protector allows circulation in the heel. The anti-microbial silver fibers, shaped or grooved polyesters, nylon fabric blends or nonwovens or the like, covers a molded hydrophilic open-cell foam free rise or frothed foam or Foss composite 20 that supports the arch and insures the skater of a comfortable stride.

Figure 6:
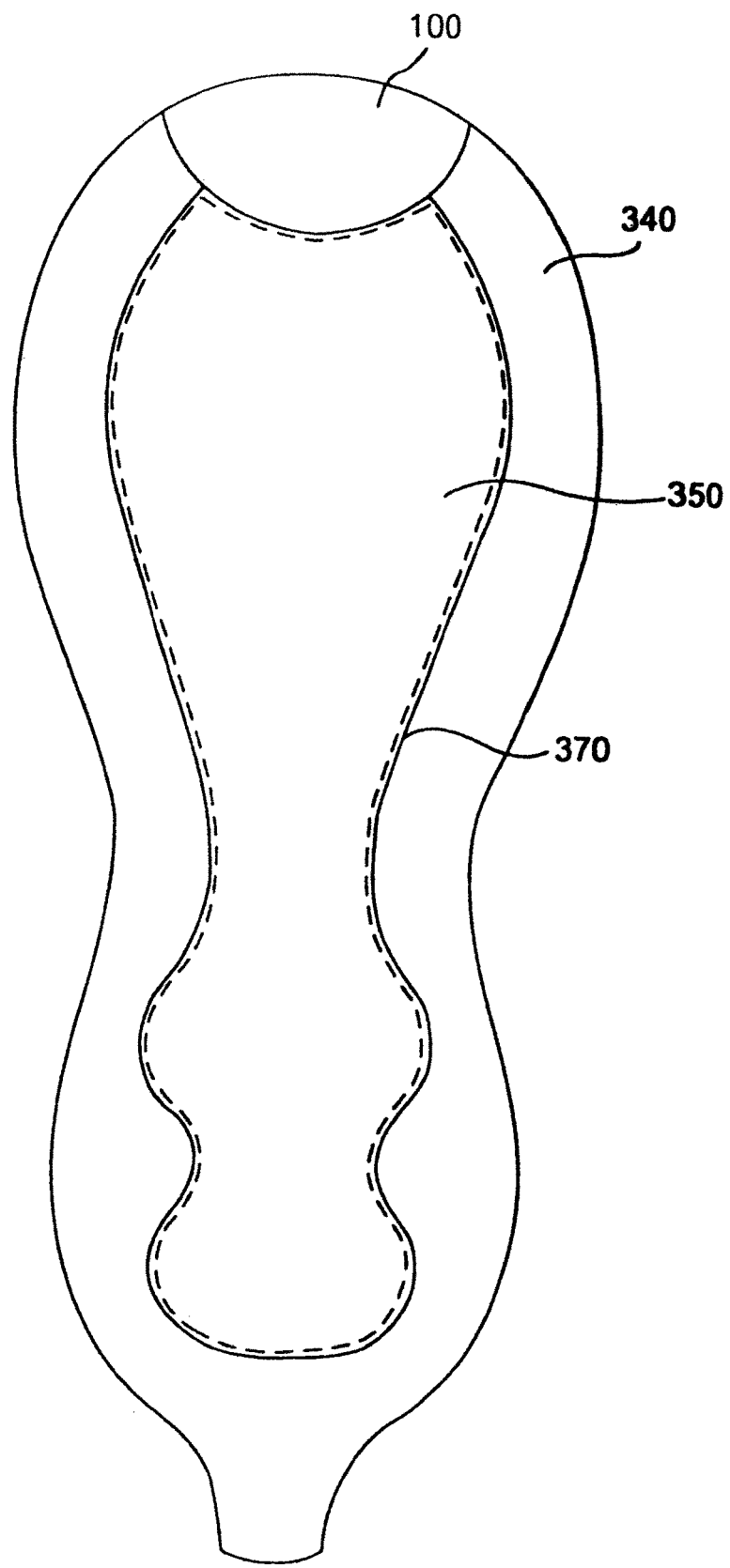
FIGS. 6 and 7 illustrate a tongue portion of a shoe constructed according to the first embodiment of the present invention.
Figure 7:
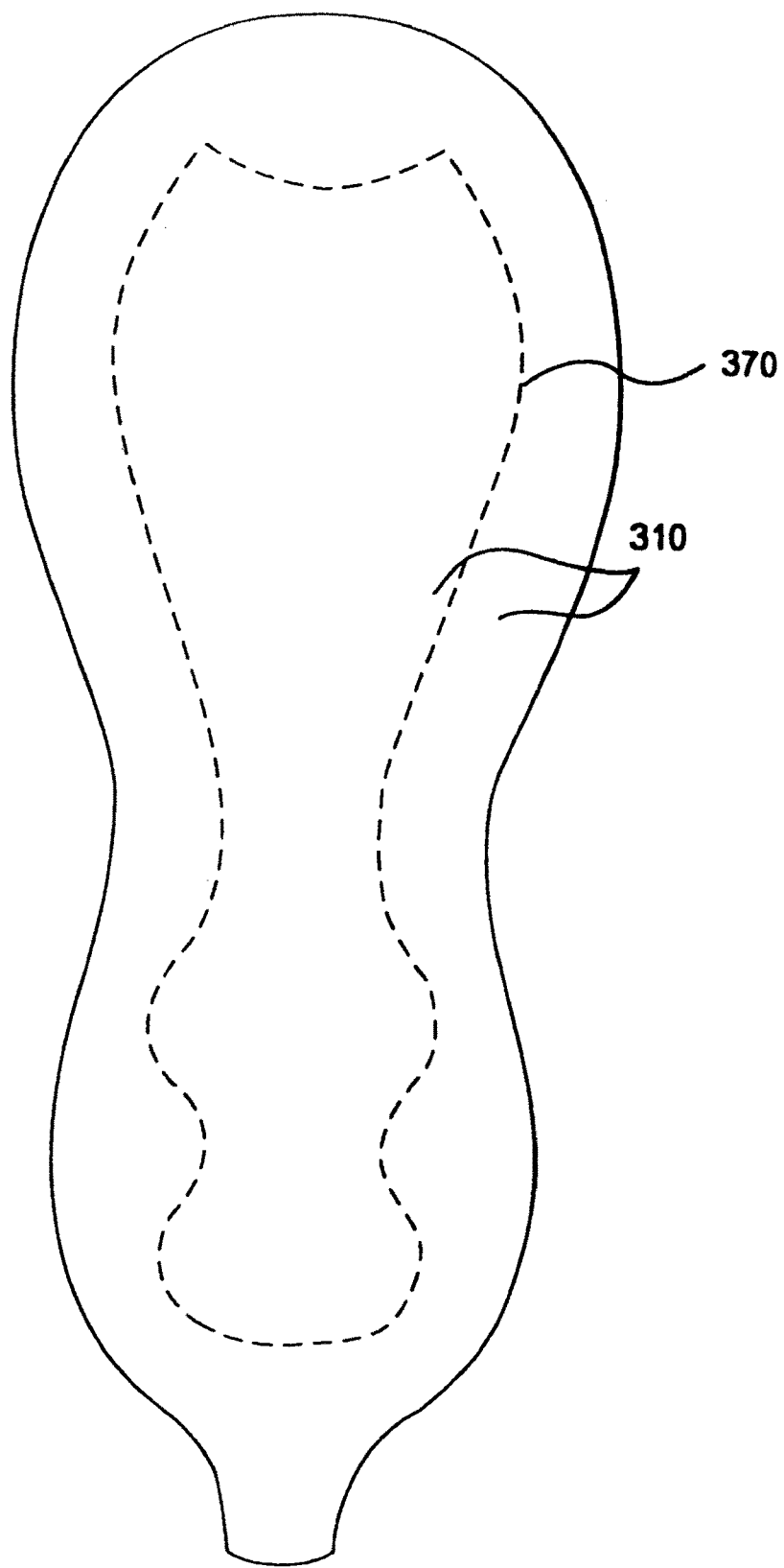
Figure 8:
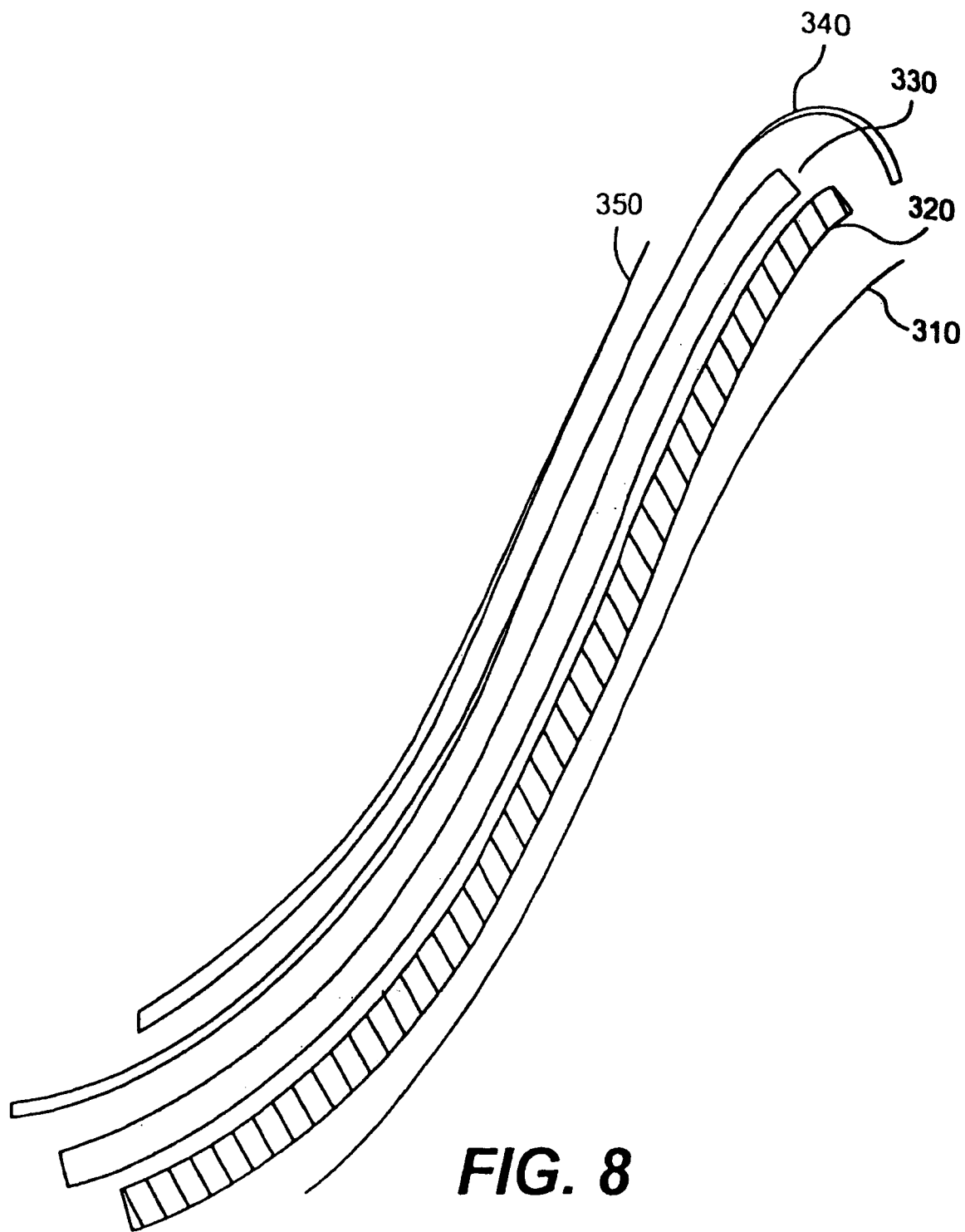
FIG. 8 illustrates a more detailed view of the liner portion used for the tongue of FIGS. 6 and 7.

FIGS. 6, 7, and 8 illustrate the tongue 300 of the boot in more detail. The tongue is designed to add further comfort and support. As shown in FIG. 8, an inner liner fabric 310 of the tongue 300 is preferably one of the other inner materials mentioned above, especially the Evolon® nonwoven, polypropylene, polyester or LYCRA®, elastine, SPANDEX® blend, polyester microfiber by Coville or the like DriLine or the polyester looped terry or the like. This inner liner fabric 310 is preferably laminated to a structural support moldable foam layer 320, which is preferably a ⅛-¼ inch anti-microbial, breathable, reticulated and/or slow recovery punctured foam. A breathable, hydrophilic, open-cell breathable or reticulated perforated foam 330 abuts a structural support foam 320. The breathable, hydrophilic open-cell or the slow recovery perforated foam 330 can take the shape of the foot bones and protect the upper foot from damage. A moldable spacer material may also be used in combination with the foam 330 or in some cases in place of the foam 330. The structural support 320 can also be shaped to accommodate the foot and protect the ankle bones. A moisture transfer material 340 lies over the outer edges of the hydrophilic perforated foam or combination foam and spacer material 330 and is connected to the inner liner 310 and underlies the outer protective polyurethane layer 350. This moisture transfer material 340 is preferably made from a material known as aero-spacer Dri-Lex, which is manufactured by Faytex Corp, or an aero-spacer fabric manufactured by Apex Mills or the like. Optionally, a nonwoven material such as Sontara Technology manufactured by Dupont® or Invista can be used.

The nonwoven material such as Cambrelle Dri-Lex, Nextec synthetic leathers, nonwovens or fabrics, Evolon® a spun lace, elastine or SPANDEX®, moisture management products by Freudenberg or the like can produce strength and moisture transfer properties to the tongue. It should be understood that these nonwoven materials can always be substituted for the knitted, aero-spacer Dri-lex, even if not specifically mentioned in other parts of this disclosure. This material 340 is wrapped around the outer edge of the tongue to allow moisture vapors traveling from the upper foot area to escape through moisture transfer material 340 to the outer surface of the tongue 300. Material 340 also aids in providing a softer edged tongue. Finally, an outer protective polyurethane layer 350, or the like, is provided over a central portion of the material 340. Another hydrophilic open-cell foam or slow recovery punctured foam (not shown) is shaped to fit between the outer protective polyurethane layer, Cordura® nylons, Kevlar®, or synthetic breathable leathers (by Daowoo Corporation, for example) 350 or the like are surrounded by aero-spacer Dri-lex 340, or a substitute as mentioned above, or the like. The protective polyurethane layer may be optional in both the shell liner and the soft boot. If the protective polyurethane layer is omitted, then the slow recovery foam (not shown) or open-cell foam may also be omitted.

As shown in FIG. 6, polyurethane, Kevlar® fabrics, or synthetic breathable leather layer (by Daewoo Corp. for example) 350 is surrounded by aero-spacer Dri-lex 340, or a substitute as mentioned above. At the top of the tongue 300 is an abrasive grip fabric 100 (such as that manufactured by Schoeller and identified by the number 6500), also shown in FIG. 4. Stitching is identified by numeral 370. FIG. 7 illustrates a top portion of the tongue 300 and shows stitching and the inner liner fabric 310. It is recommended that waterproof LYCRA®, SPANDEX® or elastine threads or and nylon thread such as those used by the Dupont, Xymid Group or Tietex, Kasbar National be used for these stitched areas or adhesive bonding by Applied Extrusion Technologies, or the like. In fact, adhesive bonding may be utilized in place of or in combination with several stitched areas on the outer liner fabrics or inner lining fabrics or composite layers.

In-line, ice and hockey skate tongues have in the past been synthetic hard-edged forms. The shape of these tongues often did not fit the skater's foot. Furthermore, vinyl may damage the upper foot where it meets the inner lining edge during active use of the in-line skate. As a result, the skater may develop blisters, calluses, or bruises on this upper-foot area. MVT brushed microfibers, fabrics and nonwovens blends in this liner system increase performance and prevent foot damage. Additionally, the inner fabrics of the tongue liner have often been non-breathable nylon, nonwovens and vinyl, thereby increasing the possibility of foot bacteria and fungus development. The optional anti-microbial fiber blends and ionized fibers and fabric discourage bacteria and fungus growth.

Figure 9:
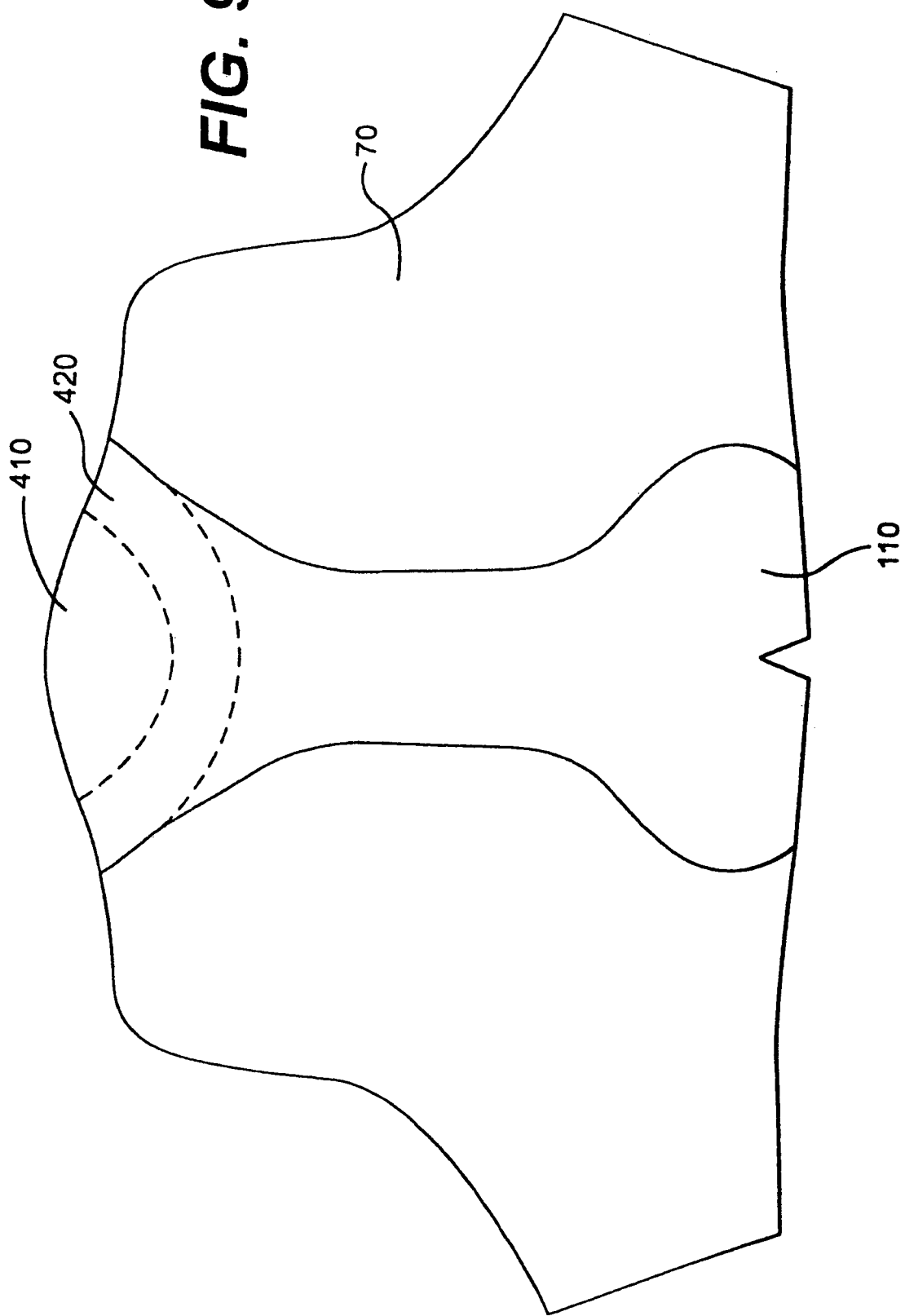
FIG. 9 illustrates a portion of the liner used in the upper cuff area.
Figure 10:
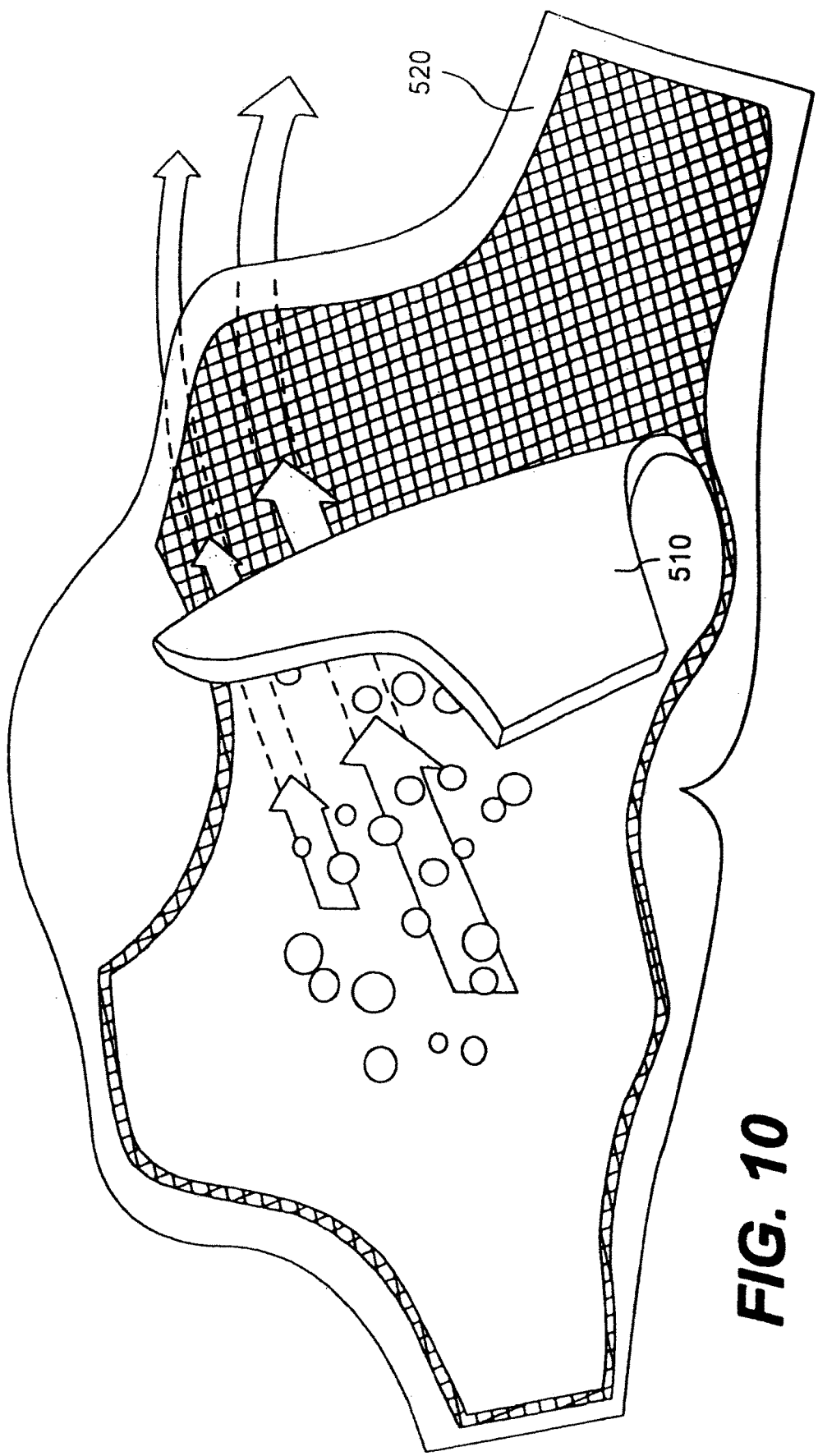
FIG. 10 illustrates the travel of moisture through a breathable, reticulated foam then a flexible mesh and into and through a breathable membrane according to the first embodiment of the present invention.

The liners are preferably provided with a pull tab 90 as illustrated in FIGS. 4, 9, and 10 on the back of a cuff 80 constructed of neoprene or reticulated foam covered by LYCRA®, elastine, SPANDEX®, or the like. FIG. 9 shows an opened-up version of the liner looking from the back of the shoe. The outer upper cuff that is exposed above the shell of the in-line, ice or hockey skate removable or non-removable liner is provided to protect a skater's leg from abrasion. Located just beneath the cuff 80 is an abrasive grip fabric material 410, such as that manufactured by Schoeller, Inc., Nam Liong or the like. Below material 410 is a reflective grip material 420. Below the reflective grip material 420 is a highly abrasive fabric 110, as shown in FIG. 4. The reflective material 14309 by Schoeller or Texon may also be used as fabric 110. Fabric 110 is preferably a Kevlar® by Toray, INVISTA®, or Schoeller (Keprotec or Schoeller Spirit) or Texon, Starlite, Cordura®, or the like. Finally, outer shell fabric 70 is the same as that shown in FIG. 4 and can be any of the fabrics previously listed in connection with outer shell fabric 70. The nylon pull tab 90 allows the skater to easily slip into the liner.

FIG. 10 shows the other side of the liner of FIG. 9. In FIG. 10, 510 can be a ¼ inch punctured moldable foam, spacer fabric, or an air bladder of a similar shape. The foam and air bladder may also be used in combination. Alternatively, the moldable foam or breathable cellulose material can be replaced by a reticulated or hydrophilic open-cell foam, silicon gel or Dicon foam or the like. A nonwoven top sheet (with or without apertures) can be attached to the moldable foam or selected fibers may be included in the foam during formation. Also, a spacer material, such as that made by Muller or the like, or a cellulose material or elastomeric by FoxRun or Baychar Technologies can be used as material 510. The 520 application represents the combination of the flexible mesh (in the case that the moldable foam is not used, as depicted), the breathable membrane and the outer shell fabric or encapsulated outer shell fabric. As in all of the figures, the arrows depict the flow of moisture.

Figure 11:
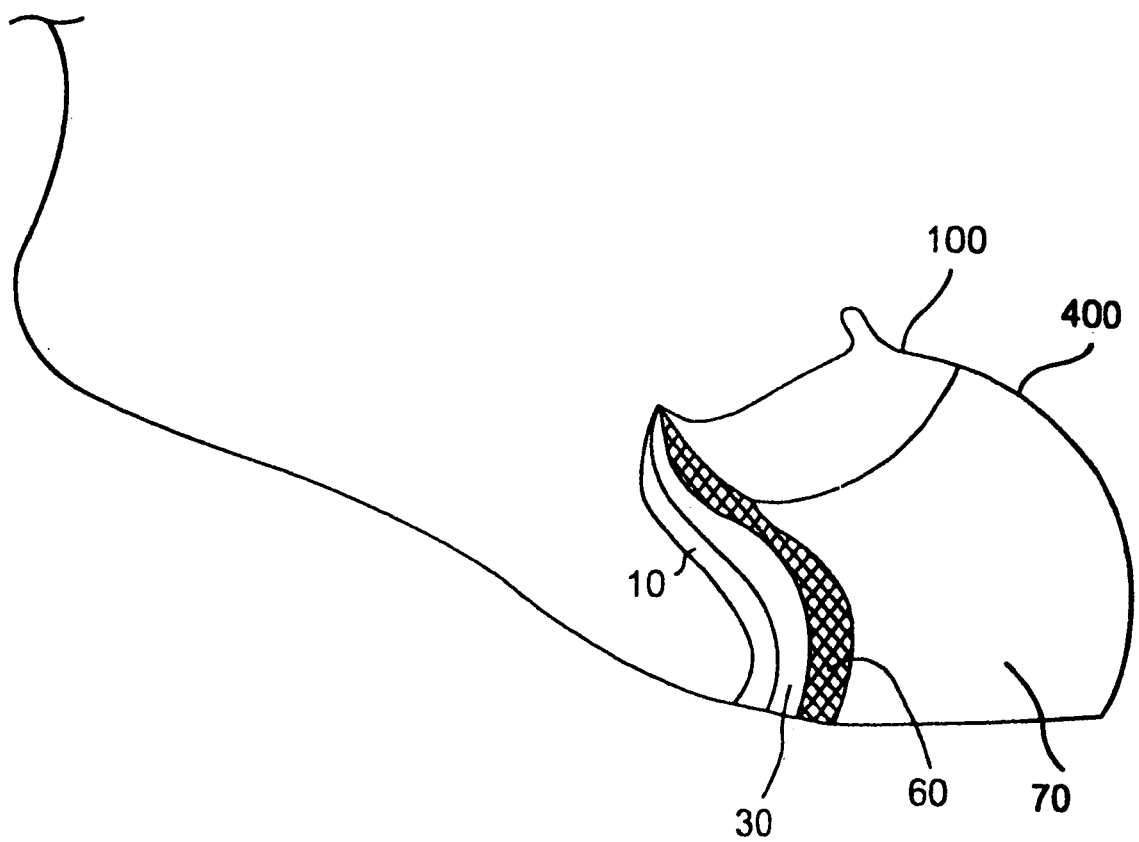
FIG. 11 illustrates the toe portion of a shoe according to a preferred embodiment of the present invention.

FIG. 11 illustrates the toe portion 400 of the shoe. Preferably, the toe portion 400 is constructed with an inner liner 10, followed by a foam material 30 or foam and mesh with or without fibers, followed by a breathable membrane 60 and the outer fabric 70 or encapsulated outer shell fabrics. The optional foam and nonwoven fiber composite blend may be used abutting the mesh or spacer material in the toe box and heel. Abrasive grip fabric 100 is also shown. Texon Aquiline, Nam Liong nylon, Kelvar products, synthetic leather, nonwoven may be used. The 6500 high abrasive fabrics manufactured by Schoeller, Inc., Nam Liong, Kelvar® and nylon fabrics or the like, are located on the back of the cuff and the top of the toe box, heel, and tongue grip area., The Kevlar® and Cordura Starlite® fabrics provide comfort and durability to the liners and are extremely strong and resistant to abrasion and allow for breathability and performance.

The microfiber technology disclosed above is rapidly developing and changing and has greatly increased the potential for improved performance of such products as in-line skates, provided that they are properly utilized as in the present invention. These new products are part of rapidly developing fabric technology. The present invention employs a combination of technical fabrics, open-cell, breathable foam layers, moisture transfer and absorbent nonwovens, breathable spacer fabrics, waterproof/breathable membranes, polymer mesh and cellulose materials, flocked fibers and foams technology, encapsulated technology, nano-technology, structural woven water repellent fabrics, or waterproof film coatings in such combinations that increase the performance of the products in which they are used as well as increase breathability. The waterproof/breathable membranes in this application may have anti-microbial fibers and/or nonwoven fibers flocked to them to increase performance properties. The flocked fiber layer attached to the membrane, outer shell fabric layer or composites layers in this invention may contain silver, corn, lyocel and/or hollow, shaped or split polymer fibers. Nano-technology may be incorporated in any layer in the composite products. Resin treated cotton and synthetics materials by Nano-Tex, NanoHorrizon's E47 fabrics, Nanomatrix fabrics by Toray and Nanosphere technology fabrics by Schoeller can be used for selected inner lining and out shell materials. Coating by Trann Technologies can be applied to SPANDEX®, cotton, and other fabrics. Silicone applications allow for moisture transfer wrinkle free and fad resistant products. Many skate protective products utilize SPANDEX® and stretchable products. The breathable moisture transfer, open-cell high or low density foam and nonwoven composite packages are lightweight and easily molded to accommodate safety helmets, protective gear, skate and technical footwear or apparel.

It should be noted that, in the case of in-line skates, the lining system of the present invention can be applied to both shell boot insert liners and soft boot applications. The soft boot in-line skate mentioned earlier in the background of the invention addressed the needs of a skater to have more flexibility and comfort yet still maintain performance levels. This new technology in the hockey, ice and in-line skate industry has increased tremendously the possibilities of a lighter weight performance product. The soft boot, in-line skate or hockey skate construction can easily accommodate the numerous moisture transfer, breathable composite combinations. The soft boot for hockey, in-line or ice skate use can be constructed with the moldable exterior Kevlar®, Cordura® or the like composites in the moisture transfer system to form tongues, side walls, toe caps and upper applications. While the soft boot does not have a protective shell, it can nonetheless be provided with a permanent integrated liner or a removable liner that enjoys all of the benefits of the present moisture transfer inner lining breathable composite systems. These moisture transfer constructions may also be applied to alpine and hiking boot products. Preferably, the outer shell materials of the moisture transfer system comprising the entire soft boot application would be comprised of a composite combination containing a number of technical fabrics such as nylon, Kevlar®, or high abrasion Cordura® fabric, such as that manufactured by Schoeller, Nam Liong or the like. These fabrics, as well as the high abrasive fabrics, are encapsulated or are provided with a waterproof/breathable membrane or coatings. A breathable, reticulated and/or open cell hydrophilic, anti-microbial germicidal foam layer by Foamex or Rubberlite or a breathable, anti-microbial, moisture transfer, nonwoven and foam blend manufactured by Foss Manufacturing abuts the encapsulated outer fabric or breathable membrane. The breathable, moisture transfer nonwoven including a foam layer manufactured by Foss Manufacturing may include elastine or SPANDEX® fibers to increase the stretchable properties. In some options the layer of foam may be eliminated and replaced by another nonwoven layer. The structural mesh, combined mesh and foam composite, molded cellulose or spacer material is stitch bonded or laminated to the 1/20-1/8 inch reticulated or open-cell hydrophilic foam. The foam thickness can vary with the products performance criteria. A slow recovery punctured foam or high density foam by Rubberlite, cellulose material, spacer material or silicon gel, or the like, are located in the heel pocket, tongue, and toe areas. An air bladder may also be added around the ankle areas to increase performance in some cases. The structural mesh or molded spacer materials abut a nonwoven top sheet or a foam and nonwoven composite that is laminated, stitched, or ultrasonically bonded to a breathable, reticulated and/or open-cell hydrophilic 1/20-1/4 snad inch foam. The 1/8 inch foam abuts preferably a cellular moisture transfer, breathable, elastomeric composite which is laminated to the inner fabric. A nonwoven top sheet laminated to 1/20-1/8 inch foam may also be used in place of the moisture transfer, breathable, elastomeric composite. Also, instead of being removable, the liner would preferably be directly attached to the base of the soft boot by methods well known in the art, such as that disclosed in U.S. Pat. No. 5,437,466. Substitutions can be made to all of the foam materials (i.e. hydrophilic open cell, Aquazone, Premium, VPF, etc.) just as discussed earlier, and are not specifically repeated here. Spacer fabrics, rubber and nonwoven materials or foam and paper composite combinations may replace any layer in the composite systems. Semi-disposable and disposable composite products may combine one or more fibers such as cotton, corn, flax, hemp, lyocel, wood pulp and/or paper fibers with a foam layer. The disclosed semi-disposable and disposable composite materials maybe combined with a needle punch nonwoven and applied to many end use product lines as a removable and replaceable insert. Other aspects of the present invention can be applied to the soft boot without any significant structural changes. The soft boot density is increased in the footbed, toe box, and heel plate. This added support provides protection and assists in maintaining technical performance levels. The in-line soft boot or shell skate breathability would be greatly enhanced with this added moisture transfer liner system. The soft boot may also employ the nonwoven top sheets and composites in a number of combinations with the foam layers to increase moisture transfer. The breathable moisture transfer system allows moisture to travel through each layer. The performance criteria, product and selected materials determine the rate of moisture transfer and breathability. It is preferable, but not necessary that the outer shell materials are breathable. In many cases a combination of exterior shell materials will allow the moisture and heat to vent in selected areas.

Also, the soft boot outer shell may be a combination of synthetic breathable leather (such as that available from Daewoo, Inc. Nextec or the like), an encapsulated, waterproof film or breathable membrane outer fabric by Gore, Schoeller, Burlington Industries, Malden Performance Fabrics or any of the former fabrics mentioned, or the like, as well as synthetic rubbers, PVC, TAR or CPU, a thermoplastic composite material. Typar Nonwovens by Sontara Technologies, Texon, or the like, may be used in combination with the outer materials in high abrasion areas. These high abrasive polymer materials are not known for moisture transfer or breathability. The suggested composite combination would allow breathable exterior shell materials such as Kelvar® and nylon fabrics to be combined with the less breathable or non-breathable materials in the system.

The outer shell combined materials are then laminated, stitched, adhesively bonded or ultrasonically bonded, or the like, to interior foam or foam and nonwoven layers. An air bladder may be added in combination with or in place of the molded foam and structural mesh to aid in comfort and performance. If the internal layers of foam and nonwovens are stitch bonded, it is recommended that the process with LYCRA®, elastine, SPANDEX® thread by the Xymid group former a Dupont® group be used or the process developed by Tietex with nylon thread, or the like. The outer shell fabric seams may be stitched or adhesively bonded. Alternatively, the outer shell is a moldable composite of shell fabric foam, needle punch thermal nonwoven with or without foam abutting inner lining material. The exterior shell material is bonded to the nonwoven by foam and may optionally include a mesh and/or fibers with anti-microbial properties. The inner lining material may be stitched, laminated or bonded with adhesives, breathable membranes or lamination to the exterior shell composite. The exterior shell fabric material may or may not be waterproofed.

The inner moisture transfer fabrics are any of the former fabrics listed as suggested for the removable liner, or the like. The foam is manufactured by Olympic Vita, Rubberlite, Dynamic foam, Dicon, Foamex or the like, in combination with a nonwoven top sheet as mentioned or the foam-nonwoven combination may be replaced with a foam/top sheet composite referred to as a cellular elastomeric composite. Presently, this invention utilizes shaped polyester fibers (4 deep groved polyester fibers or the like and/or polypropylene filtering material produced by Vitafibers QW 110-QW 150 quiet web or Tangerding Vliesstoffe (TH-FI 2108 or FF-FI 250). These materials may be substituted for the reticulated or open-cell foams previously mentioned, materials 30 and 50 for example. The composite combination can be used for apparel, medical, industrial and protective application. Tangerding Vliesstoffe or the like may have an anti-microbial fiber added with the phase change material to increase the performance properties. These breathable, moisture transfer, anti-microbial nonwoven or nonwoven and foam composite combination may be used industrially for air or water filtering applications or baby diapers and medical products. In fact, a large number of the skate composites and combinations of compositions in this invention may be used in medical and industrial applications.

Alternatively, the elastomeric cellular composite or the cellulose spacer material made with wood pulp and elastine fiber or foam materials by FoxRun may be further incorporated anti-microbial fibers. The elastomeric composite or spacer material may have a nonwoven fiber flock on one side or both sides. The elastomeric flocked fiber composite combination is anti-microbial, moisture transfer and thermal regulated and may be applied to numerous composites in this invention for helmet, protective gear, skate, soft boot and alpine shell boots, insert liners, apparel, medical and industrial.

In fact, a large number of the above technical composite combinations may be used to construct the entire product line for protective gear, sporting goods apparel, backpacks, tents, sleeping bags, bouldering shoes, water shoes, cycling shoes, sailing and golf apparel and footwear, as well as, apparel and footwear. In the paddling, water sports products and sailing apparel and accessories, the kapok fiber may be added to increase buoyancy.

Figure 12:
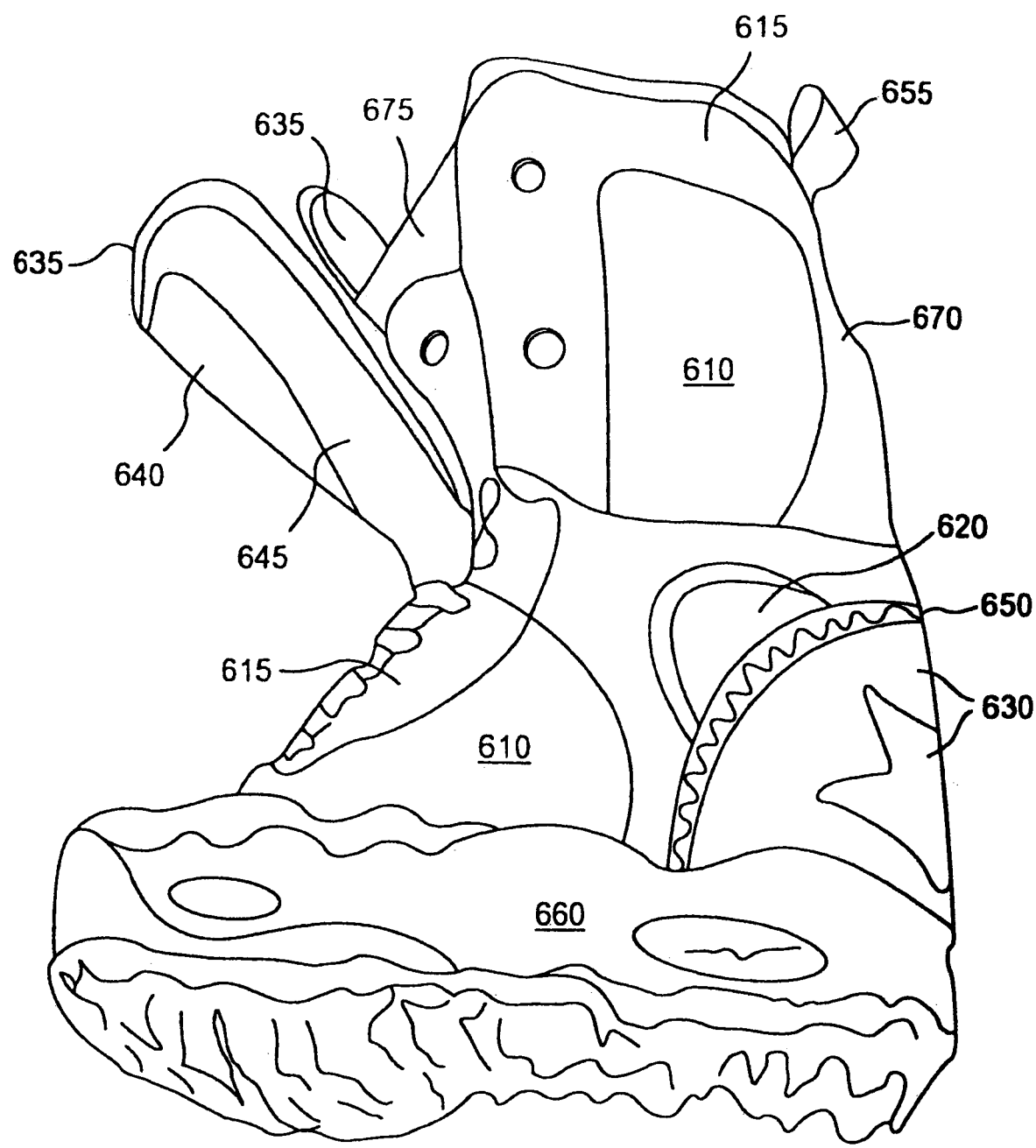
FIG. 12 illustrates an overall drawing of a snowboard boot, soft alpine boot, alpine or hiking boot which will incorporate the lining material of the present invention.

FIG. 12 illustrates a snowboard or alpine insert boot liner incorporating the moisture transfer system discussed above. The snowboard boot may have a removable or non-removable liner and the moisture transfer system may represent the layers of the entire boot from the exterior shell material inward to the inner lining fabric layer as discussed above for the soft shell or hiking boot. Bouldering shoes, hiking shoes or cross country boots can easily incorporate the thin, lightweight, breathable, moisture transfer, waterproof layers to construct the entire shoe. The following elements of the snowboard boot are shown: numeral 610 represents a waterproof breathable synthetic leather or a leather by OutDry (Nextec), a Kevlar® fabric (made by Schoeller, or a similar material), Schoeller, INVISTA® & Toray or the like, Cordura®, DYNAMIC EXTREME, KEPROTEC, or DERMIZAX by Toray; numeral 615 represents materials similar to that of numeral 610, but can have different colors for aesthetic purposes; numeral 630 represents a Kevlar® or a technical materials made by Schoeller, Nam Liong, a synthetic material, leather or the like, with the heel portion being synthetic rubber, EVA, or the like, manufactured by Daewoo; numeral 635 represents an inner moisture transfer material covering a breathable, molded breathable foam or breathable a spacer product numeral 640 represents a Kevlar® or Cordura® material; numeral 650 represents some decorative piping made of synthetic leather, stitching, polymer or the like; numeral 655 represents a pull tab made of nylon or synthetic leather; numeral 660 represents the base of the boot which can be made of a synthetic polyurethane; numeral 670 represents a reflective Kevlar® back; and finally, numeral 675 represents an optional sock that can be inserted into the boot with the permanent liner or removable insert liner if desired.

The sock 675 is made up of three or four layers and is similar to the thin race boot option. The first layer can be any of the inner liner materials discussed above. The second layer is a layer of moisture transfer, breathable, elastomeric composite, or a foam and nonwoven moisture transfer composite or thermal nonwoven composite comprised of a THERMOLITE, THINSULITE nonwoven with or without foam and silver fibers. The third layer is a material that absorbs and transfers moisture such as an ionized nonwoven blend or a polyester blend manufactured by Deercreek Fabrics, Menra Mills, or Coville fabric treated with a wicking, ionized solution or the like.

The preferable outer shell insert sock construction may be a three-layer composite constructed of an inner lining material, a nonwoven composite with foam or without foam and silver fibers and an outer shell polyester mesh waterproof with a encapsulated, film or a finish. Optionally, a spacer fabric material may replace the inner moisture transfer nonwoven composite layer. The inner lining fabric or material and outer shell layer fabric or material may be a nonwoven, knitted or a woven construction. Encapsulation technology can also be applied to the third layer by Nextec. Sock 675 can be used for additional warmth and is removable, unlike the shoe liner and can be inserted into the snowboard, alpine liner or the like, for extra warmth. The insert sock liner is breathable and preferably used in a boot where the liner is not removable or there is no liner available. The three layers can be attached to one another by lamination, although mechanical bonding, or stitching, or ultrasonically bonded, can also be used. This insert sock liner is recommended for the all-weather boot by L.L. Bean or the like.

The alpine and snowboard race boot requires a thin moldable liner option. The insert liner for the alpine race boot preferably is constructed in following three options the inner lining material abutting an open cell foam backed with a moisture transfer nonwoven top sheet. The third layer composite is laminated to the moisture transfer, breathable, MVT Thermal made by Foss Manufacturing composite and a spacer fabric material. The exterior shell fabric is laminated to a spacer fabric material.

In the second option the inner lining material is laminated to the moisture transfer, breathable, MVT Thermal developed by Baychar Technologies and manufactured by Foss Manufacturing composite and abuts the breathable moldable spacer fabric and exterior shell material.

In the third option the inner lining material is welded to moisture transfer, breathable, elastomeric composite, the moldable breathable spacer fabric and exterior shell material.

Optionally, the exterior shell fabric may be a three-layer composite constructed of foam, moisture transfer nonwoven and the exterior shell fabric. The three-layer exterior composite may be attached to the breathable spacer fabric and molded. In fact, any of the combinations may be molded, adhesively bonded and welded in this invention.

The microfiber and chemical ionized technology disclosed above is rapidly developing and changing and has greatly increased the potential for improved performance of such products as the alpine boot, provided that they are properly utilized as in the present invention. These new technical fibers, materials, foams and moisture transfer composite combinations are part of rapidly developing technical textiles technology industry. The present invention employs a combination of fabric, foam, moisture transfer nonwovens, moldable spacer materials, breathable membranes, coating, finishes, films, structurally woven or knitted waterproof fabrics, ionized fabrics, encapsulated outer fabrics in such combinations that increase the performance of the products in which they are used as well as increase breathability. The breathable membranes, coating and finishes are optional in alpine, hiking and climbing shoes. The removable sock liner may be inserted into rubber boots, all weather boots or alpine products. The discussion above has focused upon snowboard boots, alpine boots, hiking and climbing shoe liners. Similar applications can be made with running shoes, helmets, protective gear or cross country boots, or in-line skates, gloves, accessories, sleeping bags, back packs and apparel with slight modifications.

In the snowboard boot liner, the various layers can be combined by lamination, mechanical bonding, stitch bonding, ultrasonic bonding or a combination of these two. The second and third layers would include a breathable, foam that contacts the first layer and is a germicidal, reticulated foam or a hydrophilic, open-cell foam, such as VPF or Aquazone manufactured by Foamex, DRI-Z manufactured by Dicon with or without glycerin, Phase Change Foam or Schoeller PCM foam or the like. Alternatively, these layers can be a MVT Thermal made by Foss manufacturing composite. An elastomeric cellular composite inclusive of moisture transfer, nonwoven fibers or a open-cell foam backed by a moisture transfer, nonwoven, apertured top sheet composed of wood pulp, polyester, rayon, lyocel, cotton, or polypropylene, in a single process. A foam composite may be used in combination with a thermal nonwoven such as THERMOLITE, THINSULITE or the like.

The fourth layer is a hydrophilic, open cell preferably, VPF by Foamex, an open-cell, slow recovery foam by Rubberlite, or Dicon Technologies foam, or polymer flex-guard mesh or a polymer flex-guard mesh inclusive in an open-cell foam or a polyester breathable spacer material (by Muller) or the like for support. In this case, the open-cell foam, Foamex, Rubberlite or the like is laminated to a moisture transfer nonwoven top sheet composed of wood pulp, cotton, polyester, lyocel, blend which abuts a waterproof/breathable membrane (fifth layer), if used. If the flex-guard polymer mesh is used, it is included in the foam in one process or the flex guard is followed by another layer of open-cell foam with a moisture transfer nonwoven top sheet inclusive in the foam or abutting the waterproof/breathable membrane or an encapsulated or waterproof breathable coated or filmed exterior shell fabric. If the spacer material is used, it may or may not be molded to accommodate the foot. The moisture transfer nonwoven top sheet may be eliminated in selected performance categories. The breathable spacer material abuts either a waterproof breathable membrane, an encapsulated or coated fabric. The breathable spacer material may be combined with a THERMOLITE or the MVT Thermal developed by Baychar technologies and manufactured by Foss Manufacturing composite.

The Phase Change Technology by OUTLAST/INVISTA or the like may be added to any layer in the liner system and may be combined with encapsulated fibers and fabrics and combined with nanotechnology. Phase Change Technology can be used in conjunction with structurally knitted waterproof fabrics or fibers, or with the encapsulation fabrics by Nextec, Toray or the like. Encapsulation by Nextec combined with the Phase Change Technology or OUTLAST Technologies/INVISTA is an enhanced option in this embodiment, but is not essential in the products. If encapsulation is employed, then the fourth layer preferably includes THERMOLITE with or without split, shaped or grooved fibers or the moisture transfer, breathable, MVT Thermal developed by Baychar Technologies and Foss Manufacturing composite. Both THERMOLITE and the MVT nonwoven developed by Baychar technologies and manufactured by Foss Manufacturing or the like may include anti-microbial properties or silver fibers. If a non-removable liner is employed instead of a removable liner, a waterproof-breathable thin film, finishes or coating can be used instead of encapsulation or a waterproof/breathable membrane, nano-technology may be applied to waterproof any selected outer shell material.

The sixth layer in this removable shell liner may be Cordura®, STARLITE, Kevlar® fabrics or the like. The STARLITE by Faytex Corp or Faytex breathable series, Kevlar® and Cordura®s by Schoeller 6500, 14705, 13207, 13632, 65563 etc. and Nam Liong's ARMORTEX Series, DERIZAX and ENTRANT Gil by Toray.

The exterior shell fabric is preferably encapsulated or waterproofed with a breathable thin film or coating. It may be noted in this invention that there are no stated specified rates of breathable or moisture transfer. The selected products and performance category in the product line determines the selected breathable and moisture transfer rates. The MVT and breathable rates are developed by the selected fibers, foams and materials for these technical composites product systems and are determined by performance level and product company.

Alpine Cross Country Boots

A liner for the alpine cross country boots has a first layer selected from a group including polypropylene, nylon blend, polyester or polyester blends, LYCRA®, elastine, SPANDEX® or wool backed by cotton, wool, rayon, lyocel, acetate, acrylic, polyester or a nonwoven blend. The inner lining fabric or material may be an anti-microbial, anti-fungal INNOVA or ALPHA; sueded polyester; polyester field sensor; looped polyester terry; Dri-line by Milliken, Coville or Deercreek polyester blend, DRI-LEX or the like by Faytex Corp.; polyester DRI-LEX terry by Faytex; polyester fleeced blends or spacer fabric by Malden; and polypropylene backed by cotton by Coville. Alternatively, the multi-layer composite may abut the second layer.

The second layer in this embodiment may be a breathable, open-cell foam, or a moisture transfer nonwoven composite, or a breathable moldable spacer fabric for the outer shell material. These materials may be individually selected or in combinations in certain performance categories.

The breathable, germicidal, open cell hydrophilic foam second layer may be a open cell, breathable foam containing Phase Change material by Rubberlite. Foamex, Lendal or International foam. INVISTA nonwoven and foam materials with Phase Change Technologies or a foam by Dicon Technologies such as Dry-z with or without glycerin. This foam can be provided with or without a moisture transfer nonwoven top sheet. The moisture transfer nonwoven top sheet can be selected from any of the materials previously specified. Alternatively, the second layer may be an moisture transfer, breathable, elastomeric composite or the second layer can be a open-cell foam such as DRI-Z® or the like with a fiber or nonwoven later integrated into the foam layer during its construction. This moldable composite comprised of fiber and foam is created in one process and may in some performance categories contain a polymer mesh such as that developed by Naltex or webbed layer. The breathable, open-cell foam with or without the polymer mesh may alternatively, contain a nonwoven sheet constructed of the above suggested fibers contained in the nonwoven backing to assist in the absorption and transfer of the moisture passing through the moisture transfer system. The moisture vapor is pulled through the foam and nonwoven fiber layers and quickly evaporates layers. It is not necessary that the moisture vapor travel though the outer polymer shell systems as the majority of the moisture vapor evaporates before the outer shell layers. Many skates have a non-breathable exterior polymer shell material. The breathable layers and moisture transfer system can be applied to either a non-breathable, non-removable shell, removable liner insert, a breathable waterproof shell skate or footwear item.

The third layer is structural support foam or a breathable, moldable spacer material by Muller Textil. The spacer fabric is a knitted sandwich structure with a nonwoven core. The heel and arch may also have a slow recovery foam or spacer fabric added for comfort. The thickness of the layer of foam or spacer fabric and THERMOLITE may vary for performance. The third may be eliminated in some performance cross country boot applications. Or be replaced by thermal nonwoven or composite or abut a thermal nonwoven or another foam layer.

The fourth layer is a thin layer of THERMOLITE, a hollow core polyester fiber, containing a binder. THERMO- LITE combined with a breathable, open-cell foam with or without natural fibers such as corn, silver wood pulp, spandex, elastine, cotton or lyocel fibers added to absorb the moisture. The hollow polyester fibers synthetic fibers quickly move the moisture along that is absorb by the nature fiber from the abutting top sheet. Optionally, the fourth layer can be a blend of moisture transfer synthetic or natural fibers blend or the moisture transfer, absorbent nonwoven composite developed by Baychar Technologies with or without Phase Change materials or thermal fibers by Outlast or INVISTA® or an open-cell foam such as Foamex, Rubberlite or the like with a moisture transfer nonwoven top sheet made of wood pulp, lyocel, rayon, cotton, polyester, acrylic, flax, hemp, acetate, corn or polypropylene. These nonwoven fibers in combination or independently absorb and move moisture. The fourth layer may be optional in some performance categories.

The fifth layer is optionally, a breathable waterproof/breathable membrane which may be any one of the following: SECO at Shawmut Mills, THINTECH, THERMOLITE 2000/1300 standard, latex, breathable membranes by Harrison Technologies, Sympatex, or ENTRANT Gil by Toray The OUTLAST technology can be used applied to a membrane or to a outer fabric or material that has been treated with an encapsulated or nano-technology. Encapsulation technology applied to the outer shell fabric is by Nextec, Toray or the like. Alternatively, instead of the membrane, encapsulation technology or a waterproof breathable finish or film may be applied to the exterior shell materials of the sixth layer and can achieve similar results. Optionally, a combination of Phase Change Technology and nano-technology can be applied to fibers or fabrics by Burlington Technologies or the like. If encapsulation is employed, then the fourth layer preferably includes THERMOLITE, moisture transfers nonwoven blend or Moisture transfer composites (MVT Thermal) composite.

The sixth layer is one of the following fabrics. Note that if these fabrics are encapsulated, the waterproof/breathable membrane in the fifth layer may not be needed in this option. These fabrics include the following: Cordura®; LYCRA®, elastine, SPANDEX® blends; STARLITE by Faytex Corp.; Kevlar® fabric by Schoeller (14705, 6500, 13207, 13632, 65563, etc.); Nam Liong AROMRTEX Series, INVISTA® and Toray or the like, Cordura® 2000 by INVISTA®, Dermizax and ENTRANT Gil by Toray, 3 or 4 ply Supplex; Mojave and Tudor nylon and polyester blends by Travis; 6 ply Maxus nylon blends, IBQ stretch Cordura® or the like; and synthetic leathers by Daewoo, Inc., Nextec or moisture transfer nonwovens by Freudenberg, Sisa or the like. These fabrics may be used individually or in combination.

The seventh fabric option is a LYCRA®, SPANDEX® or elastine material covers a neoprene, moldable spacer fabric or slow recovery foam or reticulated open cell foam upper liner ankle cuff.

The tongue for the alpine boot is similar to the tongue of the in-line skate. The tongue of the cross country boot is similar to the snowboard boot. They can be constructed of Rubberlite, Foamex, International or the like molded foams with a moisture transfer nonwoven top sheet or moldable spacer fabrics. A slow recovery foam can also be used as specified with the snowboard boot. The inner fabric is one or more of DRI-LEX, DRI-LEX Aero-spacer, polyester FIELDSENSOR polyester by Toray, Freudenberg Nonwovens with or without phase change materials, DRILINE by Milliken, polyester spacer by Malden, polar fleece INNOVA or ALPHA polypropylene by Coville or Deercreek Fabrics, or DRI-LEX nylon, polyester blends sueded or fleeced or the like. The outer tongue fabrics are high abrasive fabrics constructed of Kevlar® and Corduras® by Schoellar or Nam Liong and DRI-LEX Aero-Spacer or other Aero-spacer materials by Faytex, or the like, and breathable synthetic and natural leathers by Daewoo, Nextec, or the like. All the leather in this embodiment can be treated with OutDry by Nextec. 3×Dry by Schoeller or the like.

CIBA chemical waterproof treatments or nano-technology may be applied to any layer in this composite to enhance, soil resistant, moisture transfer or waterproof properties.

The alpine liner can eliminate one or more layers to accommodate race liners and cross country boot applications. The preferable embodiment would contain a three layer composite liner. The inner moisture transfer fabric or material, a moisture transfer nonwoven for waterproof stain resistant exterior fabrics composite developed by Baychar Technologies manufactured by Foss Manufacturing and an exterior shell moisture transfer, waterproof material. This light weight breathable moldable composite can be adhesively bonded.

Hiking Boots

A liner for the hiking boot would include the following. The first layer is selected from a group including: polyester field sensor; looped poly terry; DRI-LEX composites by Faytex; Doeskin, BABY KID, Cambrelle by Faytex; antifungal, anti-microbial polypropylene fabrics; INNOVA or ALPHA fleeced polyester and polypropylene blends, suede surface polyester blends, COOL MAX or nylon blends, or the like. Any combination of these moisture transfer fabrics can also be used.

The second layer is a moisture transfer, breathable, elastomeric composite or a hydrophilic or a breathable, open-cell foam preferably by Foamex, International foam or Rubberlite, or Dynamic foam or Schoeller PCM foam or Outlast coated PCM foam or a DRI-Z foam or a breathable moisture transfer fabric or nonwoven layer. If a foam layer is used in the second layer, a moisture transfer absorbent nonwoven top sheet selected from previously mentioned materials can be attached as a backing.

The third layer is a molded hydrophilic open-cell foam backed by an aperture moisture transfer and absorbent nonwoven top sheet composed of cotton, polyester, polypropylene, lyocel, rayon, or wood pulp, cotton or the like. A moldable heel and ankle spacer fabric by Muller or the like may also be used in place of the third nonwoven layer or hydrophilic, open cell foam. A breathable, moldable spacer fabric or foam may be added around the toe box and back cuff. A molded heel/ankle insert by Muller Textil is preferably also used. The Muller Textil spacer fabric is a complex composite with knitted top sheets on either side of the continuous filaments sandwiched in the middle of the knitted top sheets. This breathable, moisture transfer spacer material is moldable and lightweight and can be used as a replacement for any nonwoven or foam layer in this invention.

The fourth layer optionally is a waterproof/breathable membrane which may be any one of the following: Membrane by Shawmut Mills), THINTECH, THERMOLITE 2000/1300 standard, laytex, WILCOFLEX DRY or the like. The Phase Change Technology or OUTLAST Technology may also be used independently of the breathable membrane and may also be contained in a polymer adhesive or coating to the outer fabric or fibers or applied in a foam coated dotted matrix on the back side of the fabric, foam or nonwoven layer. Also, this membrane layer may be eliminated in some models depending upon the hiker's needs. Alternatively, instead of the breathable membrane, encapsulation of the fifth layer can be performed to achieve similar results. If waterproof encapsulation is applied to the outer layer, then the third layer may be an open-cell foam or a moldable spacer fabric, a THERMOLITE, a moisture transfer nonwoven composite or a MVT Thermal composite developed by Baychar Technologies or a licensed representative of Baychar Technologies. The Phase Change Technology may be applied to the moisture transfer nonwoven, foam or fabric in this moisture liner system and may be combined with outer shell encapsulated fibers and fabric, such as by Nextec, or the like.

The fifth and last layer is a combination of one or more of the following: Corduras®, Supplex Nylon, STARLITE, Tudor, Kevlar®, nylon blends, polyester nylon blends, and waterproof breathable synthetic and natural leathers. Preferably, this layer is waterproofed by using encapsulation, waterproof finishes or films or coatings. Waterproof treatment to the exterior shell leathers, synthetic leathers and/or materials can be applied by OUTDRY by Nextec, DURA-PEL PLUS, HYPER D-WR or ENTRANT G2-XT, eXY Moisture transfer, breathable, absorbent elastomeric composite technology may be inserted between the exterior shell fabric and the breathable membrane, if applied, or the moisture transfer, breathable, elastomeric composite may be a moisture transfer nonwoven thermal blend on one side and the exterior shell fabric on the other side. Optionally, the thermal nonwoven composite comprised of engineered fibers with or without a foam layer may be abutting the exterior shell material or a frothed foam and the outer shell material. Furthermore, the breathable liner according to the present invention could also be added to clothing such as shirts, pants, gloves, helmets, backpacks, etc., by omitting elements such as the structural mesh and by adjusting the number of foam material layers and their thickness. For example, clothing preferably has a moisture transfer, wickable inner liner, followed by an elastomeric or an open cell foam ¹⁄₁₆, ⅛ inch and the outer shell fabric. A moisture transfer nonwoven may or may not be laminated to the foam. Optionally, a breathable membrane abuts the foam or moisture transfer nonwoven and is laminated to the outer fabric. The outer fabric may be waterproofed by encapsulated, laminated to a breathable waterproof membrane, coated with a waterproof finish or film, structurally woven or knitted to repel water or contain nano-technology. If encapsulation technology or a waterproof breathable film or finish is applied to the exterior shell fabric than the breathable membrane may not be applied. Indeed, the amount of foam may be replaced by a nonwoven composite blend. Presently, this liner system is combining an open-cell foam abutting an open-cell foam and encapsulated outer shell fabric as one embodiment. Optionally, the MVT Thermal made by Foss Manufacturing, THERMOLITE or a nonwoven thermal or nonwoven composite combined with foam may be used abutting the inner lining fabric and the outer shell fabrics. The suggested moisture transfer and absorbant nonwovens and foam composite can be mechanically bonded.

This invention can also be used for industrial and medical applications by using polyester spun bonded filter products by Tangerding Vlitesstoffe, Vitafiber, or the like, combined with alternating hydrophilic foam layers and nonwoven blends. The nonwoven composites are constructed to filter, absorb and transfer moisture and microscopic particles.

Other Applications

Figure 18A:
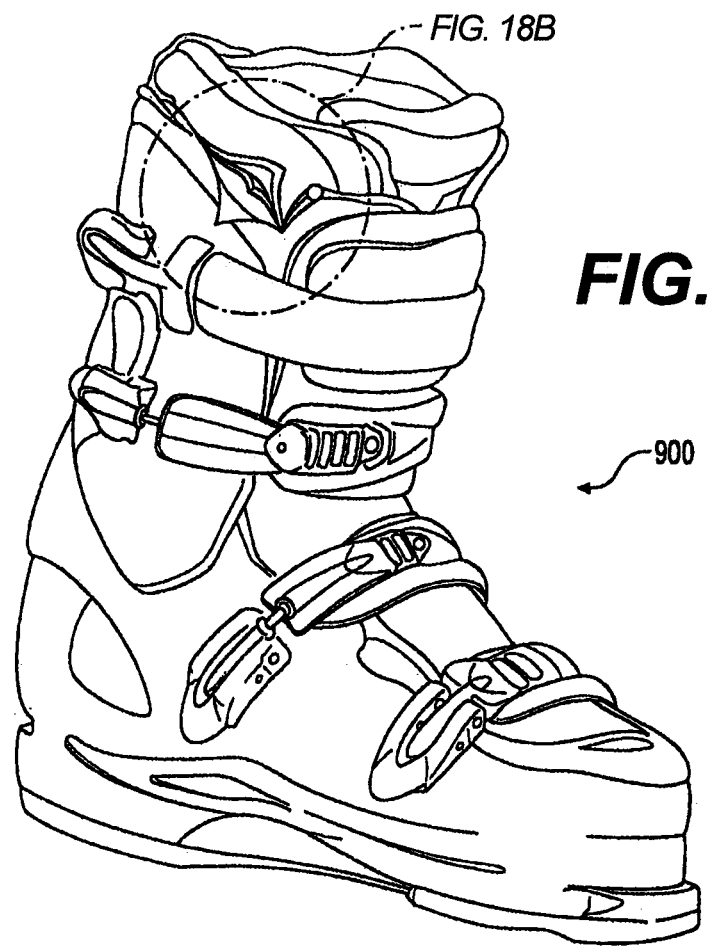
FIGS. 18A and 18B illustrates a soft-shell alpine boot exterior shell composite with a first portion enlarged.
Figure 18B:
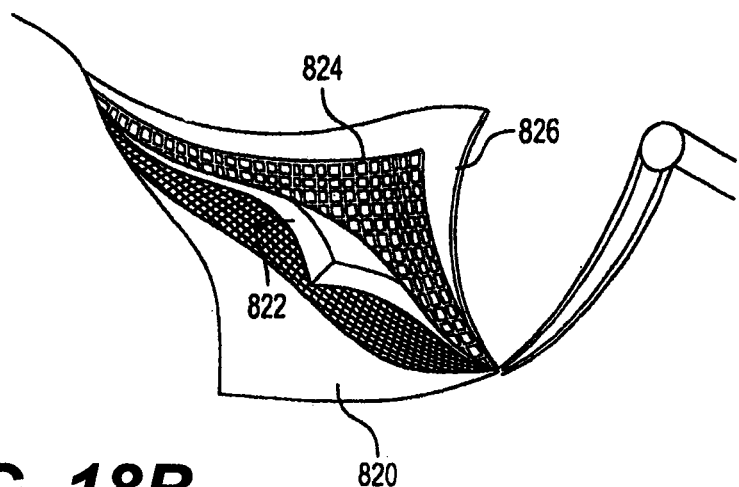
Figure 19A:
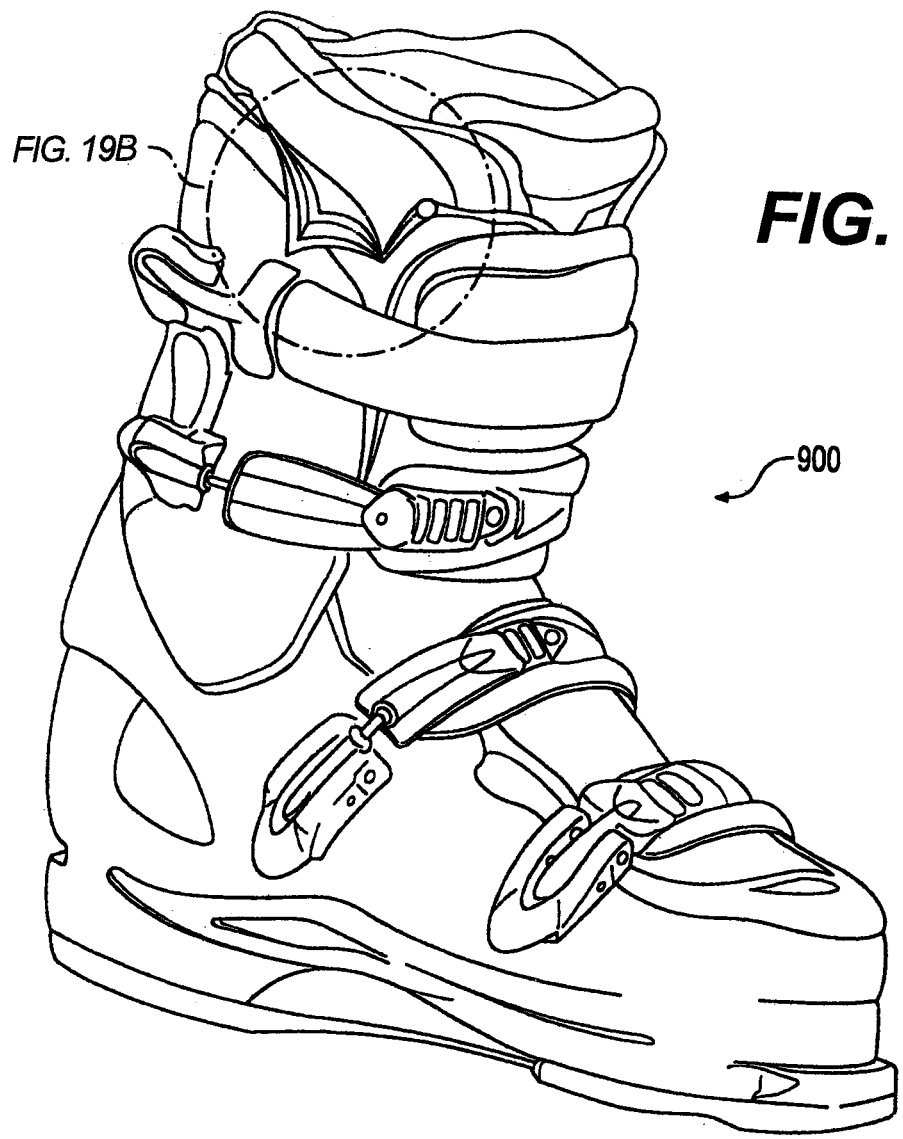
FIGS. 19A and 19B illustrates a soft-shell alpine boot exterior shell composite with a first portion enlarged.
Figure 19B:
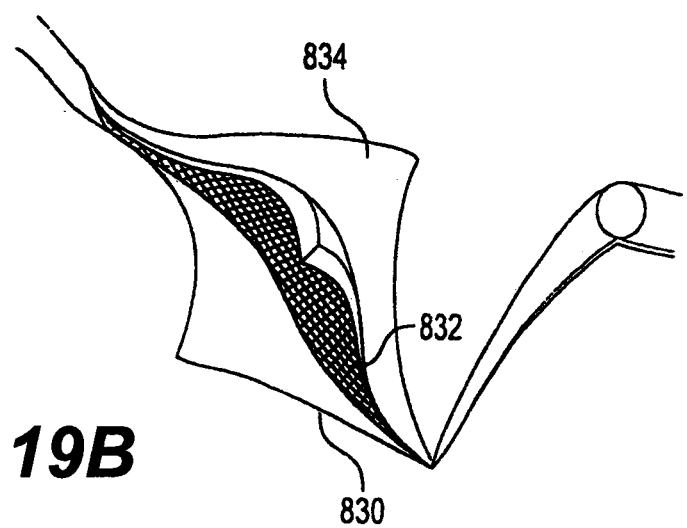
Figure 20:
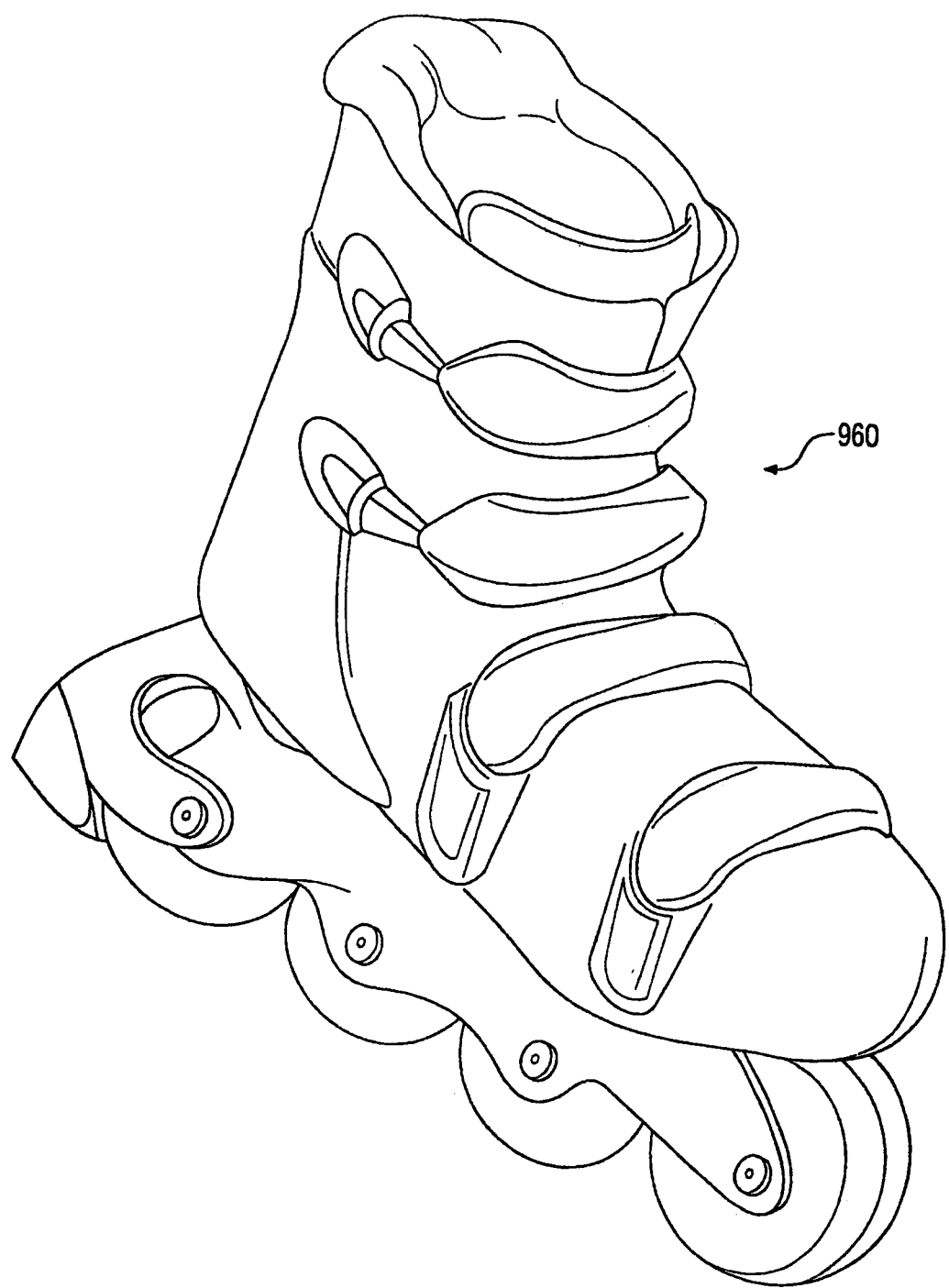
FIG. 20 is a polymer shell for a hockey skate including a moisture transfer liner.
Figure 21:
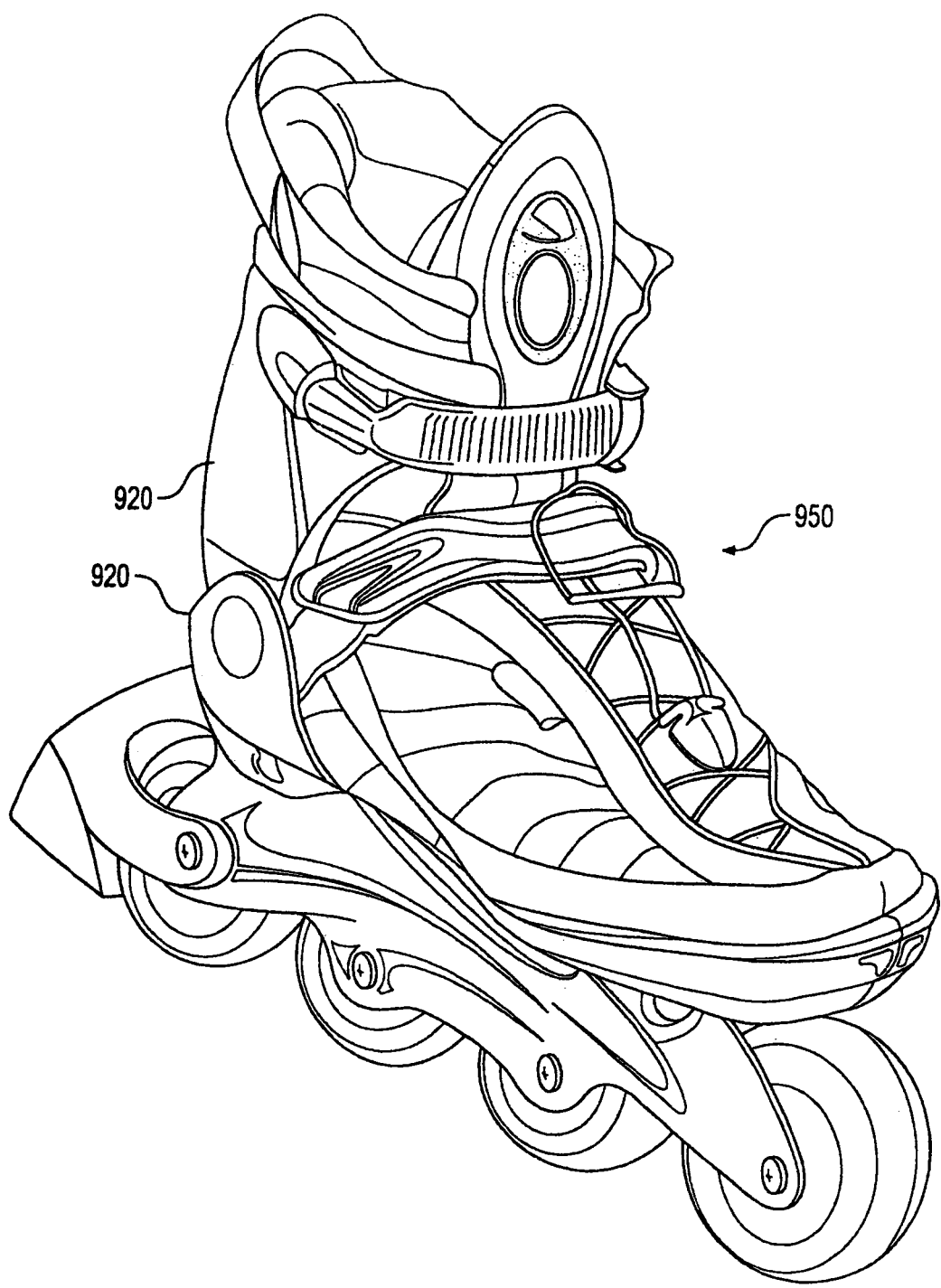
FIG. 21 illustrates soft-shell in-line skate or the like exterior shell composite.

FIGS. 13-22 disclose various other embodiments of the present invention as follows. FIGS. 13-18 show a detachable, removable insert liner for soft shell skates and other products. These liners are inserts and can be used in hockey skates and other types of footwear. The same construction can be applied to a complete boot rather than an insert. This is shown in FIG. 21. FIG. 21 is an example of a complete skate containing the same materials as the inserts in FIGS. 13-18, and built in the same way as these inserts. Soft shell alpine boots are illustrated in FIGS. 18 and 19.

Figures 13A, 13B:
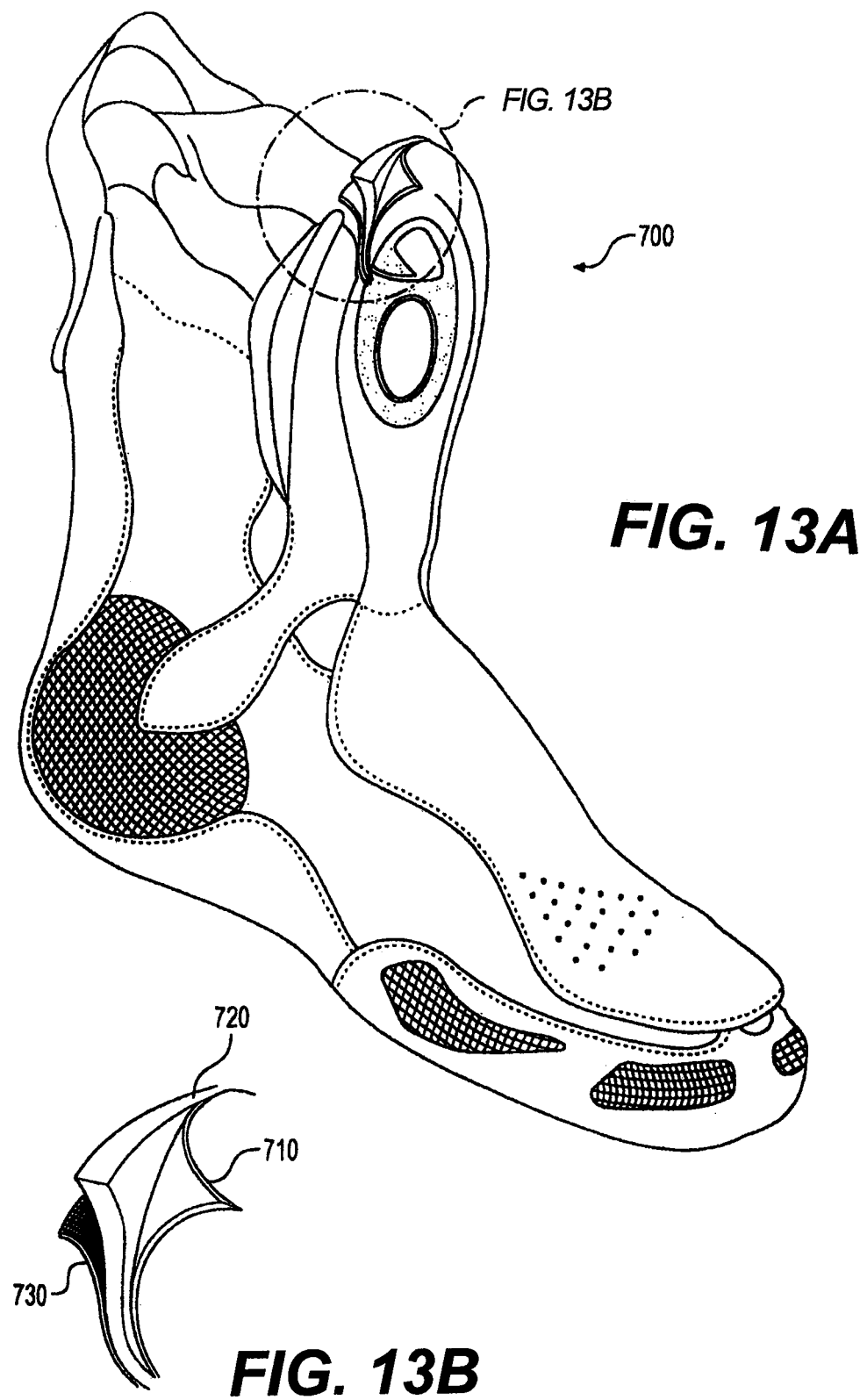
FIGS. 13A and 13B illustrate an insert for an in-line skate or hockey skate with a first portion enlarged.

FIGS. 13 and 13A illustrate an insert (700) for an in-line skate, ice or hockey skate with an enlarged first portion. In FIG. 13, numeral 710 represents a composite of one layer, two layers, or three layers. 710 shows outer shell fabric, foam, nonwoven, with no top sheet, the top sheet is the outer shell fabric in this case. 710 can be an exterior shell fabric or material abutting a cellular moisture transfer, breathable, elastomeric composite, or the fabric can be backed by a flocked fiber combination abutting the foam and followed by a nonwoven or a knit. Alternatively, the same combination may be used without flocking. Optionally, layer 710 can be a single layer of fabric or material, or a double layer, including fabric or material abutting a nonwoven. Preferably, the composite layer is a 3 layer construction of fabric, foam, and nonwoven. Layer 720 is a spacer fabric. Optionally, layer 720 is a combination which may include multiple layers of foam and nonwoven. In some performance categories, 720 can simply be a foam or a nonwoven. Layer 730 is a nonwoven or a cellular moisture transfer, breathable, elastomeric composite or an inner lining fabric or material such as a knit.

Figures 14A, 14B:
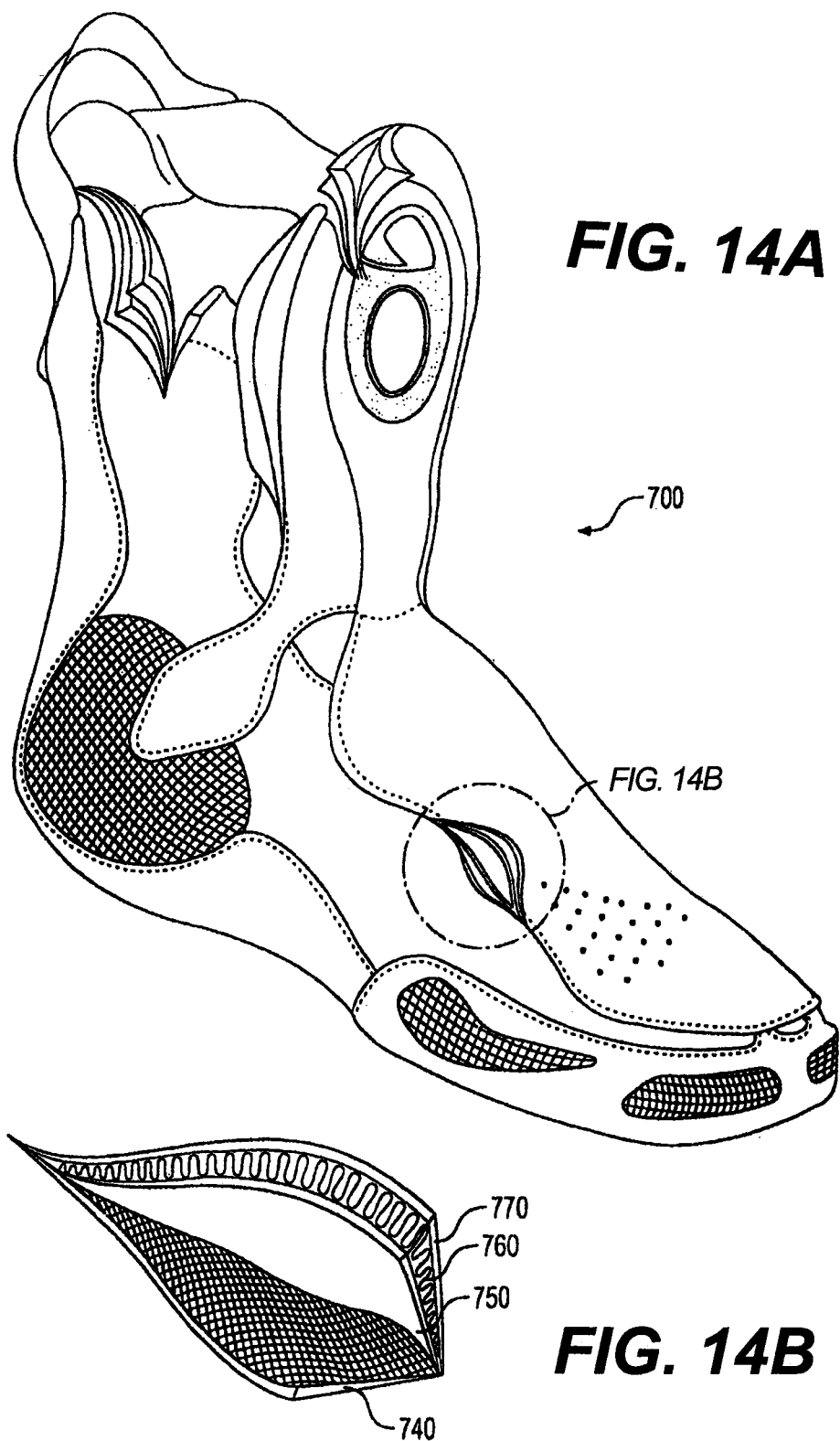
FIGS. 14A and 14B illustrate another embodiment of an insert for an in-line skate or hockey skate with a second portion enlarged.

FIGS. 14 and 14A illustrate another embodiment of an insert (700) for an in-line skate or a hockey skate with a second portion enlarged. 740 illustrates a one-, two-, or three-layer composite. The top sheet can be optionally composed of: (1) a nonwoven or a knitted layer; (2) a nonwoven or a knit and a foam; (3) a nonwoven or a knit with a cellular moisture transfer, breathable, elastomeric composite; or (4) a nonwoven and a foam composite.

Layers 750, 760 and 770 together compose a spacer fabric or a moldable foam with a mesh. Optionally, the spacer fabric or foam with a moldable mesh may include a nonwoven thermal such as THINSULITE or THERMOLITE with or with out silver fibers by Foss Manufacturing or the like or a thermal composite made of nonwoven shaped and grooved fiber blends and silver fibers. The preferable construction replaces the 3 layers (750, 760, and 770) with a single layered spacer fabric. In some multilayer constructions, the specific layers could be broken down as follows: (1) layer 750 may be a knit, woven, nonwoven construction, or foam, or an moisture transfer, breathable, elastomeric composite; (2) layer 760 may be a foam, nonwoven or a combination of foam and nonwoven; or (3) layer 770 may be a knit, woven, nonwoven, foam, or an moisture transfer, breathable, elastomeric composite.

FIGS. 15 and 15A illustrate another embodiment of an insert (700) for an in-line skate or hockey skate with a third portion enlarged. 780 could be a combination of an outer fabric and a foam or a combination of an outer fabric a foam and a non-woven. 782 has many options. One combination is a foam with a mesh, a non-woven, another foam, and another non-woven. A second combination has a foam, a mesh, a non-woven, a second foam, and a second non-woven. A third combination is a non-woven, a foam, a second non-woven and a non-woven composite manufactured by Foss. Optionally, all nonwoven layers may be a cellular moisture transfer, breathable, elastomeric composite and may include silver fibers by Foss Manufacturing.

784 has three options. One option is a spacer fabric. A second option is a moldable foam. The third option is a combination of a foam and a polymer mesh, manufactured by Naltex.

786 has the following options. It could be an outer fabric plus a foam or a foam and non-woven composite (Foss composite). Another option is an outer fabric and a moisture transfer, breathable, elastomeric composite. Finally, 786 could be a Foss composite and a moisture transfer, breathable, elastomeric composite together with an outer shell fabric. In some performance products the layers of 782 are omitted. It should be noted here that all composite materials can be backed by a flocked fiber blend which may contain silver fibers.

FIGS. 16, 16A and 16B illustrate an insert (800) for a soft-shell alpine boot with first and second portions enlarged. 802 illustrates a composite including an inner moisture transfer material, a foam and a nonwoven. 802 may also be an inner moisture transfer material, abutting a nonwoven and foam composite or a cellular moisture transfer, breathable, elastomeric composite. 804 illustrates a composite of a nonwoven, a foam, a second nonwoven and a second foam. Alternatively, 804 may be composed of a foam and a nonwoven with silver fibers (this combination is an example of a moisture transfer thermal), and in some performance categories a cellular moisture transfer, breathable, elastomeric composite may be combined with a moisture transfer thermal. This whole layer can be eliminated in some performance categories. Nonwovens in this composite may be replaced by a knitted fabric. 806 illustrates a spacer fabric or a breathable moldable foam. The moldable foam may include a polymer mesh, with or without silver fiber blends, or other fiber blends including wool fibers. In one option the silvers and natural blends abut the spacer fabrics and may be followed by a thermal nonwoven layer. Thermal nonwovens such as THINSULITE and THERMOLITE or the like may include the silver fibers by Foss Manufacturing. Layer 806 is a moisture transfer thermal composite composed of a nonwoven and foam blend. The foam with mesh can be followed by a nonwoven or another foam. The foam nonwoven composite may be constructed in the following ways: (1) foam-nonwoven-foam; (2) nonwoven-foam-nonwoven; (3) nonwoven-foam-nonwoven-foam-spacer fabric; or (4) nonwoven-foam-nonwoven-spacer fabric. All of these combinations may include silver fibers or fiber blends and are considered moisture transfer thermals. In some options, the nonwoven layer may be replaced with a knitted layer, or a cellular moisture transfer, breathable, elastomeric composite. 808 illustrates a cellular moisture transfer, breathable, elastomeric composite or a foam and nonwoven abutting an exterior shell fabric. The moisture transfer thermal composite may be combined with a polymer mesh and the exterior shell fabric in layer 808. Alternatively, 808 can be the exterior shell fabric open cell foam with or without silver fibers or fiber blends abutting a nonwoven, a nonwoven thermal blend or a nonwoven and foam composite. This exterior shell composite is moldable, transfers moisture, and regulates temperature with fiber additions. The exterior shell fabric may be waterproofed in the following ways: (1) with encapsulation; (2) with breathable membrane; (3) with waterproof breathable film or finish; or (4) with fibers treated or constructed to repel water. A preferable three-layer construction for golf shoes, running shoes, cross-country boots and apparel includes a waterproof exterior shell fabric, an open-cell foam, or a cellular moisture transfer, breathable, elastomeric composite abutting a knitted or nonwoven inner moisture transfer material. Optionally, the foam, nonwoven or cellular moisture transfer, breathable, elastomeric composite may include blends containing either silver or wool fibers, or both.

FIG. 16C also illustrates in layer 910 a spacer fabric abutting layer 912. Optionally, 910 can be a foam with a fiber blend and polymer mesh added. 912 is preferably a moisture transfer thermal, composed of a foam nonwoven antimicrobial blend with silver fibers. Alternatively, 912 can be a nonwoven thermal without foam or a thermal nonwoven with silver fibers. 914 is a one-, two-, or three-layer composite. It can be an outer shell fabric or material, abutting a breathable foam followed by a nonwoven. Alternatively, the outer shell fabric may abut a cellular moisture transfer, breathable, elastomeric composite or thermal nonwoven.

FIGS. 17, 17A and 17B illustrate an insert (800) for a soft shell alpine boot with first and second portion enlarged. 810 represents an outer shell fabric, a foam and a nonwoven composite. The 810 layer is preferably moldable antimicrobial thermal breathable, and transfers moisture. The 810 layer can be developed in a number of constructions. Layer 812 can be an outer shell fabric and a breathable foam, an outer shell fabric a breathable foam and a nonwoven, or an outer shell fabric and a cellular moisture transfer, breathable, elastomeric composite, or outer shell fabric and a moisture transfer thermal with or without foam. Layer 812 is a spacer fabric, which can optionally be a breathable foam with or without a polymer mesh and silver fibers or fiber blends. Layer 812 can be optionally is a moisture transfer thermal moldable nonwoven composite, and in some performance categories the foam can be replaced with a cellular moisture transfer, breathable, elastomeric composite included in the nonwoven layer. Layer 810 and layer 814 are similar to each other in this three-layer construction. Optionally, layer 814 can be a two-layer construction. Layer 814 illustrates a composite with an outer shell fabric and a foam, or an outer shell fabric and a nonwoven, or an outer shell fabric and a foam, or an outer shell fabric and a cellular moisture transfer, breathable, elastomeric composite. Preferably layer 814 is an outer shell fabric abutting moisture transfer thermal composite including breathable foam and silver fibers. Layer 816 is a moisture transfer thermal nonwoven inserted between the options in layer 814 and a spacer fabric in layer 818, or a foam with or without a polymer mesh. Optionally, layer 816 can be a foam nonwoven composite or a cellular moisture transfer, breathable, elastomeric composite. This multi-layered composite abuts an inner lining material and forms the moldable liner insert or permanently attached liner. In some options, this liner may incorporate 3-15 layers. The spacer fabric in layer 818 can optionally be a foam, a nonwoven or a combination. Layer 18 may also be a foam with a moldable polymer mesh.

FIGS. 18 and 18A illustrate a soft shell alpine boot (900) incorporating lining materials such as those shown in FIGS. 16 and 17. In the enlarged portion of FIG. 18, 820 illustrates an inner lining material. 822 illustrates a foam nonwoven composite and optionally 822 may be a cellular moisture transfer, breathable, elastomeric composite or a breathable foam. Layer 824 illustrates a polymer mesh. The polymer mesh in 824 can be included in a foam, or in a nonwoven, or in a foam and nonwoven composite, or alternatively it may abut layers with any of these constructions. One option, layer 820 abuts a cellular moisture transfer, breathable, elastomeric composite including a polymer mesh. Layer 826 illustrates another inner lining material. 826 may alternatively be a nonwoven and a cellular moisture transfer, breathable, elastomeric composite or a knitted construction and a breathable foam or a three-layer composite composed of an inner lining material, a foam and a nonwoven or a three layer composite comprised of a inner moisture transfer fabric, treated with a dotted, phase change foam matrix on the side and an waterproof exterior shell material. Preferably, the outer shell soft boot composite is composed of an outer shell fabric, a frothed open cell foam in a single layer or dotted matrix, a moisture transfer nonwoven, or nonwoven composite and an inner lining material. This composite is moldable, transfers moisture, and is thermal and waterproof.

FIGS. 19 and 19A illustrate a soft shell alpine boot (900) incorporating lining materials such as those shown in FIGS. 16 and 17. In the enlarged portion of FIG. 18, 830 illustrates an inner lining material. 832 illustrates a foam nonwoven composite and optionally 832 may be a cellular moisture transfer, breathable, elastomeric composite or a breathable foam. Layer 834 illustrates another inner lining material. 834 may alternatively be a nonwoven and a cellular moisture transfer, breathable, elastomeric composite or a knitted construction and a breathable foam or a three-layer composite composed of an inner lining material, a foam and a nonwoven. Preferably, the outer shell soft boot composite is composed of an outer shell fabric, a frothed open-cell foam or a dotted Phase Change matrix on the back side of the exterior moisture transfer material, a moisture transfer nonwoven, or nonwoven composite and an inner lining material. The foamed, dotted matrix containing phase change materials can be applied to any layer in the three-layer composite. This composite is moldable, transfers moisture, and is thermal and waterproof.

FIG. 20 illustrates a polymer shell for a hockey skate 960 including a moisture transfer liner.

FIG. 21 illustrates a soft shell inline skate (950) incorporating any of the insert materials of FIGS. 13-15. The soft shell inline skate does include some polymer shell materials identified as 920. Similar material also forms a part of the soft shell alpine boot of FIG. 18 although not explicitly identified. In some options, the polymer shell material in 920 can be eliminated from the soft alpine or skate boot, and in other options the shell material may be increased to provide more support.

All nonwovens, foams, fabrics, materials or composites can have fibers flocked to either one or both sides. The flocked fiber blend may include silver fibers by Foss Manufacturing.

While the present invention has been described above in connection with the preferred embodiments, one of ordinary skill in the art would be enabled by this disclosure to make various modifications to the disclosed embodiments and still be within the scope and spirit of the present invention as recited in the appended claims.

Any composite constructions or combination of composites in this application may be applied to technical apparel, casual sportswear, protective clothing, snowboard or biking helmets, accessories, in-line skates, ice skates, hockey skates, medical and industrial applications.

What is claimed is:

1. A cold, warm or all-weather boot, hiking shoe, running shoe or medical accessory product comprised of a series of material layers comprising:
   a first layer of a breathable, moisture transfer, antimicrobial inner lining fabric or material or a combination of fabric and material;
   a second layer comprised of a mechanically bonded, breathable, moisture transfer, antimicrobial nonwoven material comprised of shaped, channeled, grooved, and lobed synthetic polymer fibers, antimicrobial silver polymer fibers and natural and synthetic, thermal and/or cooling fibers wherein the nonwoven material provides adjustable thermal regulation;
   a third layer, combined with at least a portion of the second layer and including a breathable, moisture transferring, absorbent, nonwoven material or open-cell, anti-microbial, germicidal foam material; and
   a fourth exterior layer comprised of a breathable, antimicrobial woven fabric, knitted fabric, spacer fabric, nonwoven material or leather material or a combination thereof.

2. A cold, warm or all-weather boot, hiking shoe, running shoe or medical accessory product according to claim 1, wherein the natural and synthetic thermal or cooling fibers include split fibers, hollow fibers, bi-component fibers, stretchable fibers, polyester fibers, nylon fibers, wool fibers, lyocell fibers, acrylic fibers, PVA fibers, or a combination thereof.

3. A cold, warm or all-weather boot, hiking shoe, running shoe or medical accessory product according to claim 1, wherein the first, second, third, and fourth layers are adhesively or ultrasonically bonded or flame laminated.

4. A cold, warm or all-weather boot, hiking shoe, running shoe or medical accessory product according to claim 1, wherein at least one or more layers in the product are treated with or include a thermally regulating coating, nanotechnology coating, antimicrobial bacteria-resistant silver polymer fiber technology or antimicrobial treatment or a combination thereof.

5. A cold, warm or all-weather boot, hiking shoe, running shoe or medical accessory product according to claim 1, wherein one or more layers of the boot, hiking shoe, running shoe or medical accessory product contains hollow fibers, wool fibers, lyocell fibers, acrylic fibers, PVA fibers, polyester fibers, acetate fibers, rayon fibers, polypropylene fibers, nylon fibers, antimicrobial silver polymer fibers, 4 deep groove polymer fibers or shaped, lobed and channeled polymer fibers or a combination thereof.

6. A cold, warm or all-weather boot, hiking shoe, running shoe or medical accessory product according to claim 1, wherein the second nonwoven material layer is adhesively bonded or mechanically bonded to a pre-developed thermal bonded, spun bonded or polymer, wet or dry laid nonwoven material.

7. A cold, warm or all-weather boot, hiking shoe, running shoe or medical accessory product according to claim 5, wherein the second nonwoven material layer is attached to a breathable, antimicrobial, knitted spacer fabric.

8. A cold, warm or all-weather boot, hiking shoe, running shoe or medical accessory product according to claim 6, wherein the fourth exterior layer is treated with a is treated with a soil and water resistant nanotechnology, thermal regulated phase change coating, encapsulated web technology, or a combination thereof.

9. A cold, warm or all-weather boot, hiking shoe, running shoe or medical accessory product according to claim 1, wherein the boot, hiking shoe or running shoe product includes a composite footbed comprised of comprised of a first layer antimicrobial fabric or nonwoven material, a second layer nonwoven and a layer of moldable foam.

10. A performance footwear, apparel or medical accessory product for hot, cold, and all-weather conditions, the performance footwear, apparel or medical accessory product comprised of a series of material layers comprising:

a first layer of a breathable, moisture transfer, antimicrobial inner lining, fabric or nonwoven material or a combination of fabric or nonwoven material;

a second layer comprising a breathable, moisture transfer, absorbent, antimicrobial, mechanically bonded, antimicrobial, nonwoven material comprised of shaped, channeled, grooved and lobed synthetic polymer fibers, antimicrobial silver polymer fibers and natural and synthetic, thermal and cooling fibers wherein the fiber combinations naturally provide adjustable thermal regulation; and a third exterior layer comprised of a breathable, antimicrobial woven fabric, knitted fabric, spacer fabric, nonwoven material, leather material or a combination thereof.

11. A performance footwear, apparel or medical accessory product according to claim 10, wherein the natural and synthetic thermal and cooling fibers include split fibers, hollow fibers, PVA fibers, acrylic fibers, polyester fibers, acetate fibers, rayon fibers, polypropylene fibers, nylon fibers, grooved and shaped bi-component polymer fibers, stretchable fibers, wool fibers, lyocell fibers, cotton fibers, rayon fibers or a combination thereof.

12. A performance footwear, apparel or medical accessory product according to claim 10, wherein the nonwoven material is comprised of 4 deep groove shaped and grooved synthetic polymer fibers and antimicrobial, silver, bi-component polymer fibers having more than one polymer in the sheaf and core of the fiber.

13. A performance footwear, apparel or medical accessory product according to claim 10, wherein the nonwoven material is combined with hollow fibers, wool fibers, acrylic fibers, split fibers, hollow fibers, PVA acetate fibers, rayon fibers, polyester fibers, polypropylene fibers, nylon fibers, acetate fibers, lyocell fibers, cotton fibers, antimicrobial, silver, bi-component polymer fibers or a combination thereof.

14. A performance footwear, apparel or medical accessory product according to claim 13, wherein the third exterior later is treated with a thermally regulating coating technology, soil and water resistant nanotechnology, encapsulated web technology, antimicrobial silver treatment or a combination thereof.

15. A performance footwear, apparel or medical accessory product according to claim 13, wherein the second nonwoven layer is combined with an antimicrobial, germicidal, open cell foam material.

16. A performance footwear, apparel or medical accessory product according to claim 12, wherein the first layer is a nonwoven material comprised of shaped fibers, hollow fibers, wool fibers, acrylic fibers, split fibers, hollow fibers, acetate fibers, rayon fibers, polyester fibers, polypropylene fibers, nylon fibers, PVA fibers, acetate fibers, lyocell fibers, cotton fibers, silver polymer fibers or a combination thereof.

17. A performance footwear, apparel or medical accessory product according to claim 16, wherein the third exterior layer is treated with a thermally regulating coating technology, soil and water-resistant nanotechnology, encapsulated web technology, antimicrobial silver treatment or a combination thereof.

18. A performance footwear, apparel or medical accessory product according to claim 10, wherein the first, second and third layers are adhesively or ultrasonically bonded or flame laminated.

19. A cold, warm or all-weather boot product, hiking or running shoe product, soft shell apparel product or medical accessory product comprised of a series of material layers comprising:

a first layer comprised of a breathable, moisture transfer, antimicrobial knitted or woven fabric, spacer fabric, nonwoven material or a combination thereof;

a second layer comprising a breathable, absorbent, mechanically bonded, moisture transfer, antimicrobial nonwoven material comprised of shaped, channeled, grooved, and lobed synthetic polymer fibers, antimicrobial silver bi-component polymer fibers having more than one polymer in the sheaf and core of the fibers and synthetic and natural, thermal or cooling fibers combined with an antimicrobial open cell foam material, the combined fibers and foam material providing moisture transfer, continuous antimicrobial protection and adjustable thermal regulation; and a third layer comprising a breathable, antimicrobial, woven fabric, knitted fabric, knitted spacer fabric, nonwoven material, leather material or a combination thereof.

20. A cold, warm or all-weather boot product, hiking or running shoe product, soft shell apparel product or medical accessory product according to claim 19, wherein the nonwoven material is comprised of shaped polymer fibers, 4 deep groove polymer fibers, hollow fibers, wool fibers, acrylic fibers, split fibers, hollow fibers, PVA acetate fibers, rayon fibers, polyester filers, polypropylene fibers, nylon fibers, lyocell fibers, cotton fibers, antimicrobial, silver, bi component polymer fibers or a combination thereof.

21. A cold, warm or all-weather boot product, hiking or running shoe product, soft shell apparel product or medical accessory product according to claim 20, wherein the third layer is treated with an antimicrobial, bacteria resistant treatment, water and soil resistant nanotechnology coating, encapsulated web technology, thermal regulating coating technology or a combination thereof.

22. A cold, warm or all-weather boot product, hiking shoe or running shoe product, soft shell apparel product or medical accessory product according to claim 19, wherein the shaped, channeled, grooved, and lobed synthetic polymer fibers are 4 deep groove polymer fibers.

23. A cold, warm or all-weather boot product, hiking or running shoe product, soft shell apparel product or medical accessory product according to claim 22, wherein the 4 deep groove polymer fibers are combined with antimicrobial silver bi-component polymer fibers and acrylic fibers or polyester fibers or a combination thereof.

24. A performance footwear, apparel or medical accessory product according to claim 12, wherein the first, second and third layers are adhesively or ultrasonically bonded or flame laminated.

25. A performance footwear, apparel or medical accessory product according to claim 14, wherein the first, second and third layers are adhesively or ultrasonically bonded or flame laminated.

26. A performance footwear, apparel or medical accessory product according to claim 17, wherein the first, second and third layers are adhesively or ultrasonically bonded or flame laminated.

27. A cold, warm or all-weather boot, hiking shoe, running shoe or medical accessory product according to claim 7, wherein the fourth exterior layer is treated with a soil and water resistant nanotechnology, thermal regulated phase change coating, encapsulated web technology, or a combination thereof.

28. A cold, warm or all-weather boot, hiking shoe, running shoe or medical accessory product according to claim 9, wherein the second layer nonwoven material is comprised of 4 deep groove polymer fiber, lobed shaped fibers, antimicrobial silver polymer fibers, acrylic fibers, PVA acetate fibers, polyester fibers or a combination thereof and a layer of open cell foam material.

29. A cold, warm or all-weather boot product, hiking or running shoe product, soft shell apparel product or medical accessory product according to claim 23, wherein the third layer is treated with a thermally regulating coating technology, soil and water-resistant nanotechnology, encapsulated web technology, antimicrobial silver treatment or a combination thereof.

30. A cold, warm or all-weather boot product, hiking or running shoe product, soft shell apparel product or medical accessory product according to claim 25, wherein the third layer is treated with a thermally regulating coating technology, soil and water-resistant nanotechnology, encapsulated web technology, antimicrobial silver treatment or a combination thereof.

31. A cold, warm or all-weather boot, hiking shoe, running shoe or medical accessory product according to claim 5, wherein the second nonwoven material layer is adhesively bonded or mechanically bonded to a pre-developed thermal bonded, spun bonded or polymer, wet or dry laid nonwoven material.

32. A performance footwear, apparel or medical accessory product according to claim 19, wherein the first, second and third layers are adhesively or ultrasonically bonded or flame laminated.

\* \* \* \* \*